United States Patent [19]
Sugawa et al.

[11] Patent Number: 5,753,003
[45] Date of Patent: May 19, 1998

[54] METHOD FOR BIO-REMEDYING POLLUTED SOIL

[75] Inventors: Etsuko Sugawa; Masanori Sakuranaga, both of Atsugi; Chieko Mihara, Isehara, all of Japan

[73] Assignee: Canon Kabushiki Kaisha, Tokyo, Japan

[21] Appl. No.: 874,576

[22] Filed: Jun. 13, 1997

Related U.S. Application Data

[63] Continuation of Ser. No. 197,408, Feb. 16, 1994, abandoned.

[30] Foreign Application Priority Data

| Oct. 16, 1993 | [JP] | Japan | 5-026933 |
| Dec. 22, 1993 | [JP] | Japan | 5-325160 |
| Dec. 24, 1993 | [JP] | Japan | 5-326945 |

[51] Int. Cl.$^6$ .................. C05F 11/08; B09B 3/00
[52] U.S. Cl. .................. 71/6; 71/9; 71/903; 71/904; 435/262; 435/262.5
[58] Field of Search ............... 71/6-10, 903, 71/904; 435/262, 262.5

[56] References Cited

U.S. PATENT DOCUMENTS

| 2,769,750 | 11/1956 | Harris ........................ 435/262 |
| 4,477,570 | 10/1984 | Colaruotolo et al. .......... 435/262 |
| 4,535,061 | 8/1985 | Chakrabarty et al. ........ 435/262 X |
| 4,761,376 | 8/1988 | Kulpa et al. ................. 435/262 |
| 4,871,673 | 10/1989 | Rehm et al. ................. 435/262 |
| 5,292,507 | 3/1994 | Charley ........................ 71/6 X |

FOREIGN PATENT DOCUMENTS

| 60-69184 | 4/1985 | Japan ................ C09X 17/00 |
| 1215886 | 8/1989 | Japan ............................. 71/6 |

OTHER PUBLICATIONS

A. Cornish et al., The Journal of General Microbiology, vol. 130, Part 10, pp. 2565–2575 (Oct., 1984).

*Primary Examiner*—Ferris Lander
*Attorney, Agent, or Firm*—Fitzpatrick, Cella, Harper & Scinto

[57] ABSTRACT

A method for biologically remedying polluted soil characterized in that pollutant-degrading microorganisms and an agent which accelerates the formation of aggregated structure of soil are fed to the polluted soil.

21 Claims, 36 Drawing Sheets

SOIL PARTICLE DIAMETER DISTRIBUTION AFTER SPRAY OF AGGREGATE-FORMING AGENT OF EXAMPLE 1

—□— 32 ~ 150 μm

—×— 150 ~ 500 μm

SOIL PARTICLE DIAMETER DISTRIBUTION AFTER SPRAY
OF AGGREGATE-FORMING AGENT OF EXAMPLE 1

—□——□— 32 ~ 150 μm

—×——×— 150 ~ 500 μm

SOIL PARTICLE DIAMETER DISTRIBUTION AFTER SPRAY
OF AGGREGATE-FORMING AGENT OF EXAMPLE 2

—□— 32 ~ 150 μm

—○— 150 ~ 500 μm

SOIL PARTICLE DIAMETER DISTRIBUTION AFTER SPRAY OF AGGREGATE-FORMING AGENT OF EXAMPLE 3

—o——o— 150 ~ 500μm

—x——x— 32 ~ 150μm

METHOD FOR BIO-REMEDYING POLLUTED SOIL

This application is a continuation of application Ser. No. 08/197,408 filed Feb. 16, 1994, now abandoned.

BACKGROUND OF THE INVENTION

1. Field of the Invention

The present invention relates to a method for bio-remedying a polluted soil by the utilization of pollutant-biodegrading microorganisms.

2. Related Background Art

There is an urgent need to develop the technique for degradation, removal and diffusion-prevention of substances which are known as chemical hazards. Technical investigations have been conducted in various fields, in particular, on the substances such as hardly-degradable chemicals, heavy metals, bio-originated less degradable materialist and crude oil of which removal is a pressing subject to protect the environment.

One of these techniques is remediation technology for polluted soil. For example, there are in situ vitrification techniques to make diffused heavy metals etc. in the soil harmless by fixation, and the vacuum extraction technique to collect volatile chemical substances in the soil. However, when these methods are applied to treat pollution spread in a wide area, problems of enormous cost and time arise.

In recent years, bio-remediation has been attracting attention as a technique for solving this problem, in which, to remedy the polluted soil, the abilities of the indigenous microorganisms in degradation, synthesis and concentration are exploited with or without reinforcement, or the microorganisms having the pollutant-degrading ability are fed into the soil. This technique is advantageous in point of cost and operation, and considered effective to remedy lightly polluted soil. Thus, the quick development of this technique is expected.

For the degradation by the microorganisms, it is essential that the non-indigenous pollutant-degrading microorganisms are predominantly present in the polluted soil in an active state. Practically, however, the number of the degrading microorganisms rapidly decreases, so that the remediation ability cannot be maintained.

The reasons for this phenomenon are considered to be the unpreferable soil environment of the polluted area for the growth of degrading microorganisms, competition with the indigenous microorganisms, and the like. For example, since the soil is a nonuniform system, moisture, concentrations of salts and the like are liable to fluctuate, whereby maintaining the continued existence of the degrading microorganisms often becomes difficult. It is likely that the non-indigenous microorganisms are expelled by the indigenous microorganisms having strong competitiveness or eaten by protozoans.

As a method for protecting the non-indigenous biodegrading microorganisms in the soil from the attack of the competitive microorganisms and for maintaining the activity thereof, there may be utilized a technique in which the microorganisms are adsorbed or bonded to an artificial carrier, and then fed to the soil to form microhabitats. However, it is difficult and time-consuming to select a carrier material which can provide an environment enabling the degrading microorganisms to prosper, to establish and to be protected from the attack of the protozoans, where the carrier itself should be harmless to the environment. Few artificial carriers made of a single material meet the above-mentioned requirements, and the cost of the carrier itself should be considered.

It is believed possible to effectively utilize the soil particle itself as the microhabitat, but such an attempt has been hardly made. The aggregated structure of the soil contributes to the existence of the microorganisms, and in fact, a method is disclosed in Japanese Patent Application Laid-open No. 69184/1985 which comprises feeding organic materials to the anaerobic microorganisms to accelerate the aggregate formation with the degradation products. However, the aggregate formation depends upon the degradation products (humus and the like) of the microorganisms, and it is unstable and takes a long time. A more reliable aggregate forming technique which can overcome such drawbacks and suitable for the aerobic microorganisms is expected for reliable soil remediation.

SUMMARY OF THE INVENTION

The present inventors have investigated the above-mentioned theme, and they have found that the soil having aggregated structure effectively permits the habitat segregation of microorganisms in a symbiotic system. Then, they have found that such aggregated structures can be easily and rapidly formed by spraying pollutant-degrading microorganisms and an aggregate-forming agent on the soil, followed by applying artificial rain to the soil, whereby the activity of the pollutant-degrading microorganisms is maintained. In consequence, the present invention has now been attained.

That is, the first aspect of the present invention is directed to a method for remedying polluted soil which comprises the step of adding pollutant-degrading microorganisms and an aggregate-forming agent to the polluted soil.

The second aspect of the present invention is directed to a method for remedying polluted soil which comprises the step of spraying pollutant-degrading microorganisms and an aggregate-forming agent on the polluted soil.

The third aspect of the present invention is directed to a method for remedying polluted soil which comprises the steps of adding pollutant-degrading microorganisms and an aggregate-forming agent to the polluted soil, and then physically disturbing the soil.

The fourth aspect of the present invention is directed to a method for remedying polluted soil which comprises the steps of adding an aggregate-forming agent to the polluted soil, physically disturbing the soil, and then adding pollutant-degrading microorganisms to the soil.

DESCRIPTION OF THE PREFERRED EMBODIMENT

Figure 1:
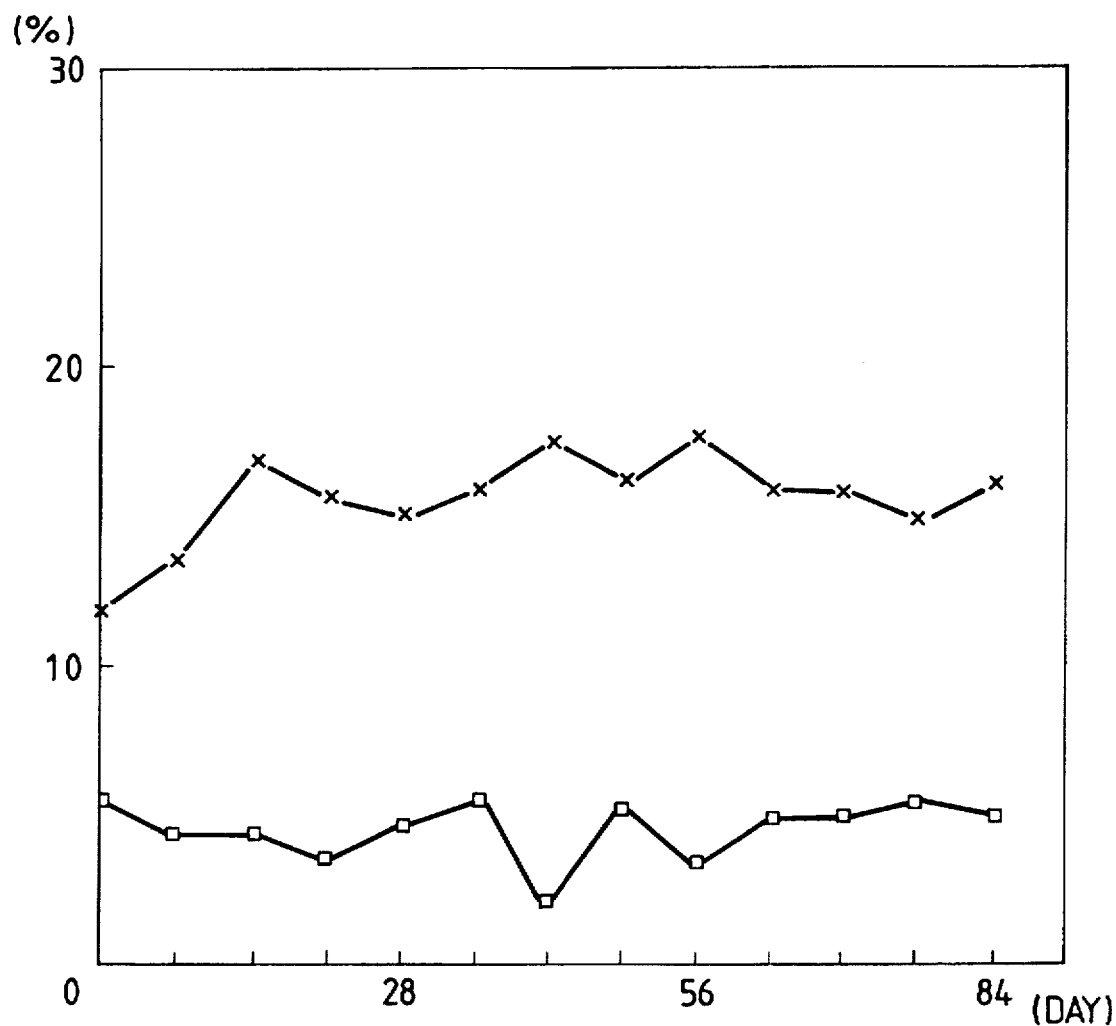
FIG. 1 is a graph showing change of soil particle diameter distribution in Example 1.

The aggregated structure of a soil can be obtained by the cohesion of fine aggregates in which extremely fine particles are associated, and in the aggregated structure, pores having various sizes are present. In general, the pores having a diameter of 6 μm or less have strong capillary force and strong water retention ability, and so the aggregated structure having such pores is suitable for the propagation of Gram-negative bacteria which are sensitive to dryness. Moreover, the pores having a diameter of 6 μm or more exert weak capillary forces, and the aggregated structure having such pores is suitable for the propagation of the large microorganisms such as mold or fungi. In this way, plural kinds of microorganisms are symbiotic in one aggregated structure, forming habitat segregation. If the pollutant-degrading microorganisms are allowed to predominantly exist particularly in the minute pores of the aggregated structure, the symbiosis and the habitat segregation of many kinds of microorganisms are possible in the various soil environments.

Furthermore, most of the bacteria are not living free in the aqueous phase in the soil, but are usually fixed on the surface of the solid phase by electrostatic interaction or with the adhesive products thereof, where the bacteria of the same species propagate in one group. Even in this case, the higher the porosity is, and the more intricate the structure of the pores is, the greater the possibility that the same kind of bacteria will adhere to the surface of the solid phase and propagate thereon, so that a high biological degradation activity can be obtained.

The method of the present invention can be applied to any microorganism and soil having any properties. Therefore the microorganism can be suitably selected and used in compliance with the chemical substance to be degraded and removed. For example, Pseudomonas species can be used to degrade organic compounds.

Further, various degrading bacteria which can degrade various substances are known, including bacteria of various genera such as Methylosinus, Methylomonas, Methylobacterium, Alcaligenes, Mycobacterium, Nitrosomonas, Xanthomonas, Spirillum, Vibrio, Bacterium, Achromobacter, Actinobacter, Flavobacterium, Chromobacterium, Desulfotomaculum, Micrococcus, Sarcina, Bacillus, Streptomyces, Nocardia, Corynebacterium, Pseudobacterium, Arthrobacter, Brevibacterium, Saccharomyces and Lactobacillus.

As the microorganism to be introduced, there can be used a microorganism already isolated or newly screened from the environment, or a mixture of different strains in compliance with the desired purpose. Unidentified microorganisms isolated by screening can be also used. In addition, they may be microorganism strains derived from a wild type strain by mutation, fusion or genetic recombination.

"Aggregate formation" in the present invention means the cohesion of fine soil particles accelerated by the use of an aggregate-forming agent to provide a microhabitat for the pollutant-degrading microorganisms. Preferably, fine particles other than those already present in the soil are added as the nuclei to accelerate the aggregate formation.

As the aggregate-forming agent, any can be used, so long as it has an adhesive effect, functions as an adhesive for the cohesion of the fine aggregates and is harmless. For example, there can be used natural adhesives including protein-based adhesives such as glue, gelatin, albumin, casein and soybean protein; starch-based adhesives such as dextrin and various starch derivatives which are condensation polymers of D-glucose and easily obtained from the raw materials such as rice, corn and potato; cellulose-based adhesives such as methyl cellulose, ethyl cellulose, cellulose acetate and viscose; and polysaccharide complex-based adhesives such as gums, manna, alginic acid, carrageenan and agar. Needless to say, these adhesives may be used in combination.

Sugars such as glucose, sucrose, fructose, lactose or the like can be degraded by the pollutant-degrading microorganisms or the indigenous microorganisms, and the resultant degradation products may function as the adhesives for the cohesion of the fine aggregates. Therefore, these sugars may be added to the soil.

From these adhesives, one or more are selected and used according to the soil into which they will be introduced. These adhesives are introduced in a suitable form of liquid, powder or the like considering the easiness of mixing and dispersion.

The above-mentioned aggregate-forming agent can aggregate the soil particles by itself, but further fine particles may be added to the aggregate-forming agent. These fine particles contribute to the formation of fine aggregates and the formation of fine pores in the aggregates to provide an environment where the activity of the pollutant-degrading microorganisms can be maintained. Judging from the fact that a pore diameter of from 1 μm to 6 μm permits the protection of the pollutant-degrading microorganisms from the attacks of protozoans, the maintenance of high water retention characteristics and the propagation of the pollutant-degrading microorganisms, it is preferred that 50% or more of the fine particles has a diameter of 10 μm or less, preferably 6 μm or less and these particles are constituted of a substance by which the pollutant-degrading microorganisms can be easily adsorbed. The material of the particles are exemplified by inorganic materials such as ceramics, alumina, kaolin, montmorillonite, allophane, podsol and bentonite; and organic materials such as polystyrenes, polyesters and other ion exchange resins, and these particle materials can be suitably selected in view of affinity to the pollutant-degrading microorganisms.

The formation of aggregates is accelerated when physical disturbance is given to the polluted soil after sprinkling on the pollutant-degrading microorganisms and the above mentioned aggregate-forming agent, so as to thoroughly mix the soil particles with the aggregate-forming agent.

(1) Heating of the soil

When the temperature of the soil is raised, the solubility of the sprinkled adhesive increases, so that the surface of each soil particle can be covered with the adhesive. With a further temperature rise, the adhesive properties of the adhesive increase, whereby the mutual adhesion of the particles can be accelerated. In order to heat the soil, any means such as a heater, warm water or warm air may be used, and no restriction is placed on the heating means. The temperature of the heated soil is preferably in the range of from 20° to 50° C., more preferably 30° to 40° C.

(2) Stirring of the soil

The stirring of the soil is very easy and advantageous in view of cost. For stirring, a shovel or a farm tractor may be used, and no restriction is placed on the stirring means. In particular, even a portion of the soil which is as deep as several meters from the surface of the ground can be easily stirred by the use of an excavator equipped with a stirring gyro.

(3) Vibration of the soil

The vibration of the soil is also very easy and advantageous in view of cost. For vibration, a civil engineering construction machine such as a vibration drill, a vibration lammer or a concrete vibrator can be used, and no restriction is placed on the means of vibration. In particular, even a portion of the soil which is as deep as several meters from the surface of the ground can be easily vibrated by the use of an excavator equipped with a vibration motor.

(4) Ultrasonic treatment of the soil

When the soil is subjected to ultrasonic treatment, the cohered soil particles are broken up, so that the uniform mixing of the soil particles and the aggregate-forming agent can be accelerated. For the ultrasonic treatment, a well into which an ultrasonic homogenizer is inserted can be used, but no restriction is put on the means of the ultrasonic treatment.

The aggregate-forming agent which has been sprinkled on the polluted soil slowly aggregates the soil particles or the added particles with the aid of any of the above-mentioned treatments (1) to (4) to form the soil aggregates. Since thus formed aggregates contain the viscous substance, they are so firm that they are scarcely collapsed by rain or the like. Simultaneously, the pollutant-degrading microorganisms penetrate the fine pores of the aggregates desirable as a propagation environment to form microhabitats. At this time, the formation of the aggregates is gradually accelerated by the penetration of rain water and the function of the indigenous microorganisms.

Alternatively, after the aggregate-forming agent has been sprinkled on the polluted soil, the physical disturbance may be given and the pollutant-degrading microorganisms may be then injected thereinto. By this operation order, the same effect as in the above-mentioned procedure can be obtained. In this case, a physical disturbance process (5) other than (1)–(4) can be used which comprises forming ice crystals in the soil, and then drying the soil. In process (5), the ice crystals grow in the soil, so that the sponge-like structure of the soil particles is formed, and while the ice crystals are dried up at a low temperature, the aggregates having fine pores can be formed. For the formation of the ice crystals, a cooler or dry ice may be used after the sprinkle of the aggregate-forming agent, and no restriction is put on the means for the formation of the ice crystals. In a low-temperature district, mere standing of the soil may allow the easy formation of the ice crystals. For drying the soil, a dehumidifier, a suction pump or the like may be used, and in a low-temperature and dry climate, the soil may be left standing. No restriction is put on the drying process.

In the case of the process (5), the formation of the aggregates and the like are achieved similarly to the processes (1) to (4). However, in the cooling and drying steps for the aggregate formation, the indigenous bacteria and the protozoans decrease. Therefore, if the pollutant-degrading microorganisms are injected at this stage, these microorganisms can be rapidly absorbed into the aggregates to form the microhabitat in which the pollutant-degrading microorganisms are predominant, whereby the activity of the pollutant-degrading microorganisms can be well maintained.

Next, examples of the present invention will be described, but the scope of the present invention should not be limited to these examples.

A KK01 strain which would be used in the following examples was obtained by the following procedure.

Ten termite workers of *Nasutitermes takasagoensis* were put in a culture dish, and ethyl alcohol (95%) was then poured thereinto to sterilize the surfaces of the termites. Next, the termites were washed twice with an M9 culture medium of the following composition (in one liter) containing 0.05% of 95% phenol to remove ethyl alcohol from the surfaces.

| | |
|---|---|
| $Na_2HPO_4$ | 6.2 g |
| $KH_2PO_4$ | 3.0 g |
| NaCl | 0.5 g |

-continued

| | |
|---|---|
| $NH_4Cl$ | 1.0 g |
| Water (pH 7.0) | Balance |

After washing, intestines of the termites were taken out with a pair of tweezers, and then crushed in M9 culture medium containing 0.05% of phenol to obtain a liquid mixture containing the crushed intestines. Next, a part of this mixture was inoculated into M9 culture medium containing 0.05% of phenol and 0.5% of yeast extract, and then cultured at 30° C. for 15 days under aerobic conditions. The amounts of phenol in the culture medium before and after the cultivation were measured to confirm the presence of phenol-degrading microorganisms in the culture medium. The change of the phenol amount was determined by filtering the culture medium through a filter of 0.22 μm to remove the microorganisms, and then measuring its absorbance (at about 270 nm) by means of a spectrophotometer.

The culture medium (including the propagated bacterial cells) obtained by the above-mentioned cultivation was spread onto the surface of phenol-containing M9 agar medium (including 0.05% of phenol and 1.2% of agar), and then cultured at 30° C. Some colonies well-grown on the agar medium were collected as isolated strains. One of these isolated strains was the KK01 strain (BP-4235) belonging to *Pseudomonas cepacia*.

EXAMPLE 1

*Pseudomonas cepacia* KK01 (BP-4235) was inoculated into 10 ml of M9 culture medium (containing 0.05% of yeast extract), and precultured at 30° C. The cells were transferred to 3 liters of the culture medium and the main culture was then carried out therein. After OD reached about 0.7, clay mineral montmorillonite (Kunipia F, made by Kunimine Industry Co., Ltd., particle diameter distribution=0.5–10 μm, average particle diameter=2 pm) which is the main component of bentonite was added to the culture to the concentration of 0.01%.

Next, to the mixture in which the montmorillonite adsorbing the above-mentioned bacteria was dispersed, sucrose and wheat flour were added as adhesives so that the concentration of each of the sucrose and wheat flour might be 0.1%, forming a bacterial suspension containing the aggregate-forming agent.

For the experiment using soil, a one meter long, one meter wide, and one meter deep stainless steel lysimeter equipped with a drain at the bottom thereof was used as a soil tank. In this soil tank, clay loam containing 37.5 to 50% of the clay mineral was laid, while the soil was sufficiently stirred so that the composition of the soil might be uniform, thus forming a test soil.

On this test soil, 3 liters of the above-mentioned cell suspension containing bacterial aggregate-forming agent containing 0.1% of sucrose and 0.1% of wheat flour was sprinkled. After sprinkling, water was applied using a sprinkling can as the artificial rain fall on the soil at 2 mm/day.

The test soil tank was allowed to stand under a vinyl sheet cover, and 3 liters of the aggregate forming agent of the above concentrations (not including cells) and the artificial rain were successively sprinkled at an interval of 7 days. The particle diameter distribution of the aggregates was measured at an interval of 7 days.

This particle diameter distribution of the aggregates was determined by sampling 50 g of the soil from the soil tank.

successively sieving the sample through 8.6 mesh (2 mm), 30 mesh (500 μm), 100 mesh (150 μm) and 440 mesh (32 μm) sieves, and then measuring the weights of the soil fractions having the respective particle diameters. This measurement was carried out in quintuplicate, and an average was taken.

As a result, the weight ratio of the soil aggregates having a particle diameter of from 32 to 500 μm increased, confirming the aggregate formation. FIG. 1 shows the changes of weight ratio (%) confirming the particle diameter increase.

EXAMPLE 2

Figure 2:
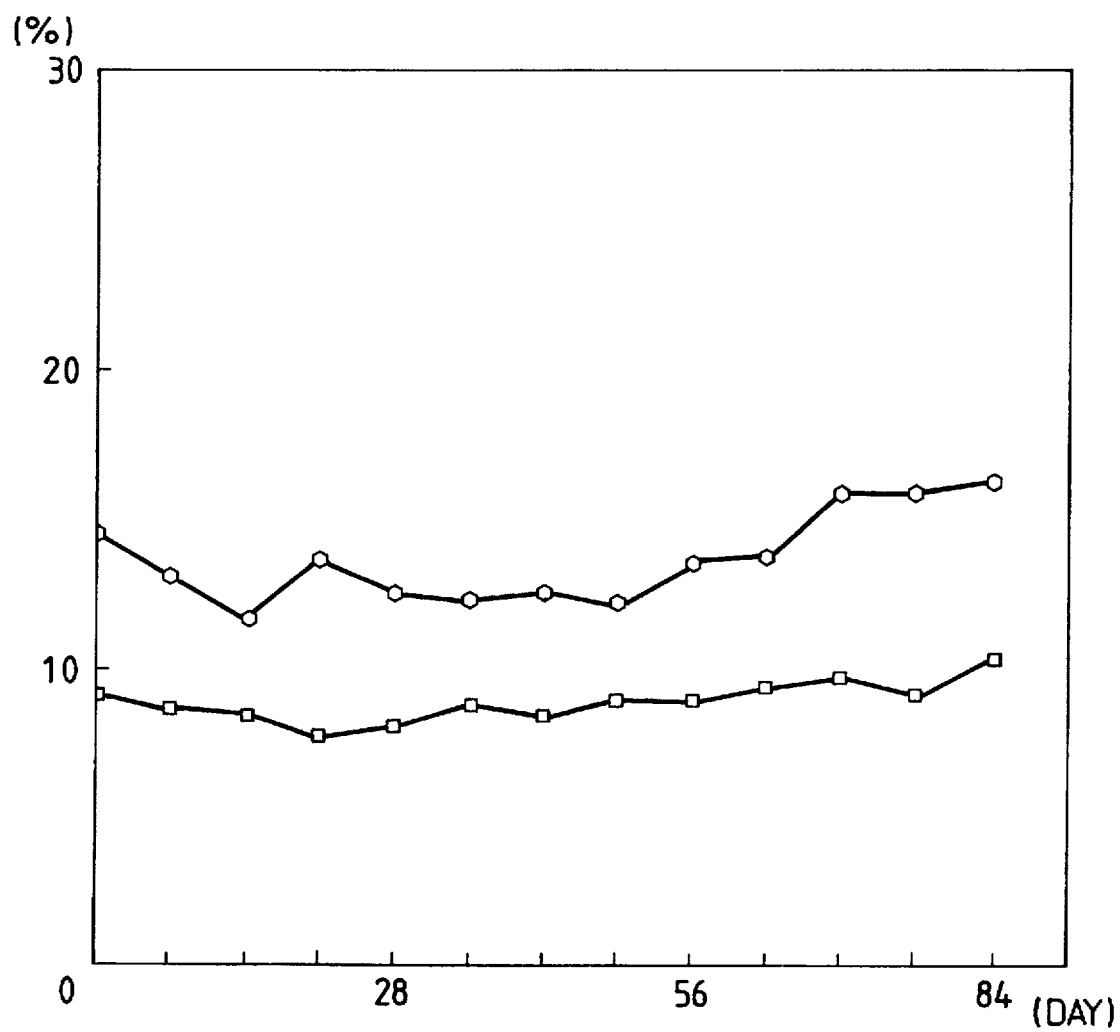
FIG. 2 is a graph showing change of soil particle diameter distribution in Example 2.

An experiment similar to Example 1 was carried out, using *Bacillus subtilis* ISW 1214. In this case, fine particles were 0.01% podzol soil, and adhesives were 0.01% of sucrose and 0.1% of cellulose in the aggregate-forming agent. As in Example 1, after the first operation, three liters of the aggregate-forming agent were sprinkled on the clay loam in the test soil tank, and the particle diameter distribution of the soil was then measured at an interval of 7 days. The measurement was made in quintuplicate, and an average was taken. The results are shown in FIG. 2, and the simillar aggregate formation was confirmed as in Example 1.

EXAMPLE 3

Figure 3:
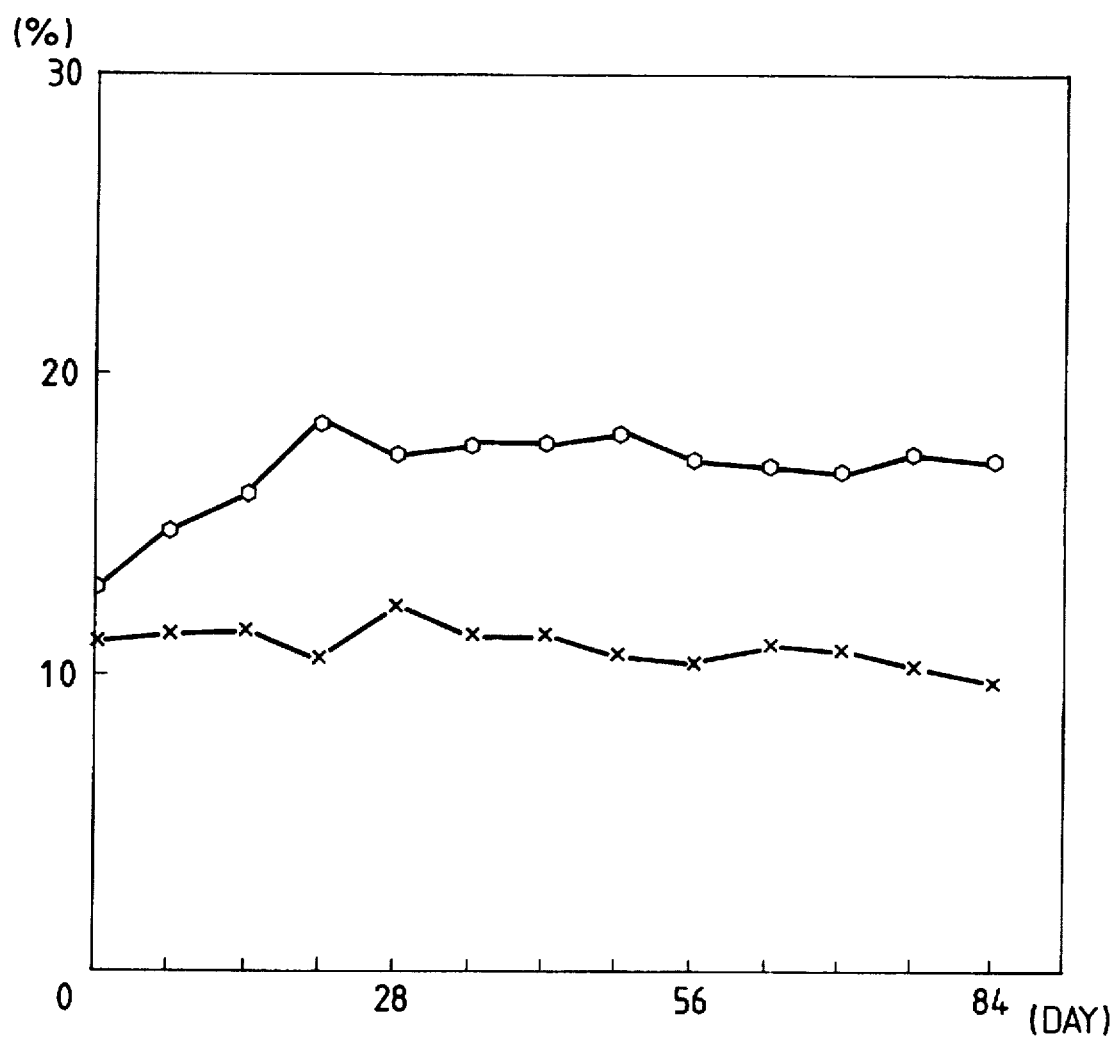
FIG. 3 is a graph showing change of soil particle diameter distribution in Example 3.

An experiment similar to Example 1 was carried out, using *Saccharomyces cerevisiae* YPH 499 mating type MAT a. In this case, fine particles in the aggregate-forming agent were 0.01% of montmorillonite, and adhesives were 0.1% of sucrose and 0.1% of cellulose. After the first operation, three liters of the aggregate-forming agent were sprinkled on the test soil of sand loam at an interval of 3 days, and the particle diameter distribution of the soil was then measured. The sand loam of the test soil contained clay minerals at from 12.5 to 25%. The measurement of the particle diameter distribution was made in quintuplicate, and an average was taken. The results are shown in FIG. 3, and the same aggregate formation as in Example 1 is confirmed.

EXAMPLE 4

Figure 4:
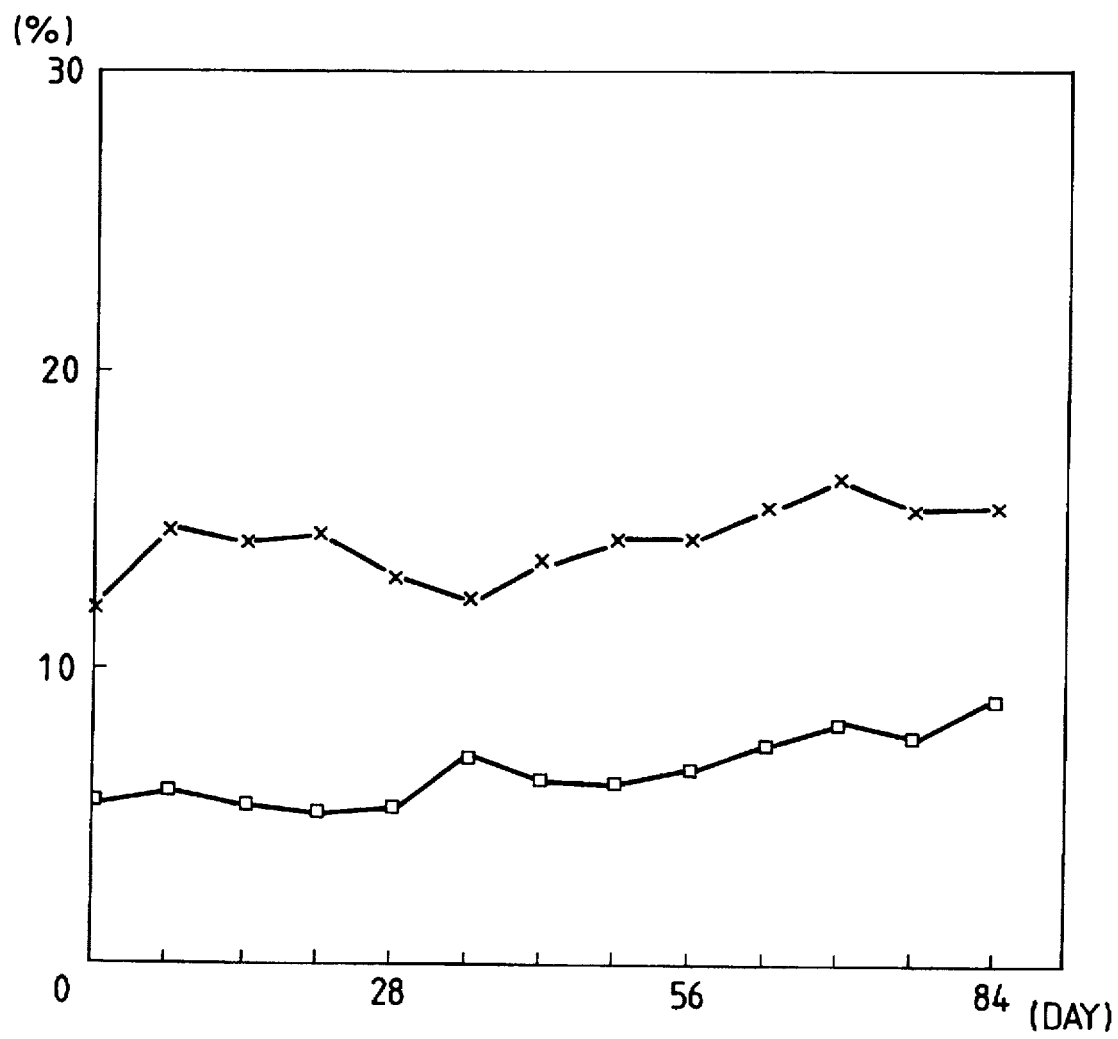
FIG. 4 is a graph showing change of soil particle diameter distribution in Example 4.

The same experiment as in Example 1 except that the bacterial cell suspension was prepared as follows: *Pseudomonas putida* BH (Hashimoto and Fujita, J. Jap. Sewage Soc., Vol. 24, p. 27–33, 1987; and M. Fujita et al., Wat. Res., 27, p. 9–13, 1993) was precultured in L medium (10 g/l of peptone, 5 g/l of yeast extract, 1 g/l of glucose and 15 g/l of NaCl), and inoculated into 3 liters of the culture medium, and then cultured at 30° C. for 24 hours. The results are shown in FIG. 4, and the same aggregate formation as in Example 1 was confirmed.

EXAMPLE 5

From the soil in Example 1, in which the formation of aggregates was going on, a fraction having a particle diameter of from 32 to 500 μm where the increase of particle diameter distribution was confirmed was collected as much as 5 g every 2 weeks, and 5 ml of M9 medium containing 0.05% of yeast extract was added to each sample. Afterward, the sample was stirred by means of a homogenizer, and the cell number of *Pseudomonas cepacia* was counted by MPN method.

The number of the bacterial cells adsorbed on montmorillonite was counted as follows. The number of the total bacteria was determined by a straight-line relationship between absorbance and bacterial cell number, and then montmorillonite was added and allowed to settle, followed by counting the cell number in the resulting supernatant. The difference between the former count and the latter count gives the number of the cells adsorbed on montmorillonite. The above mentioned straight-line calibration curve between absorbance and cell number was prepared by plate-dilution method wherein an aliquot of a cell suspension of appropriate absorbance is spread on the agar medium containing phenol as a single carbon source.

Figure 5:
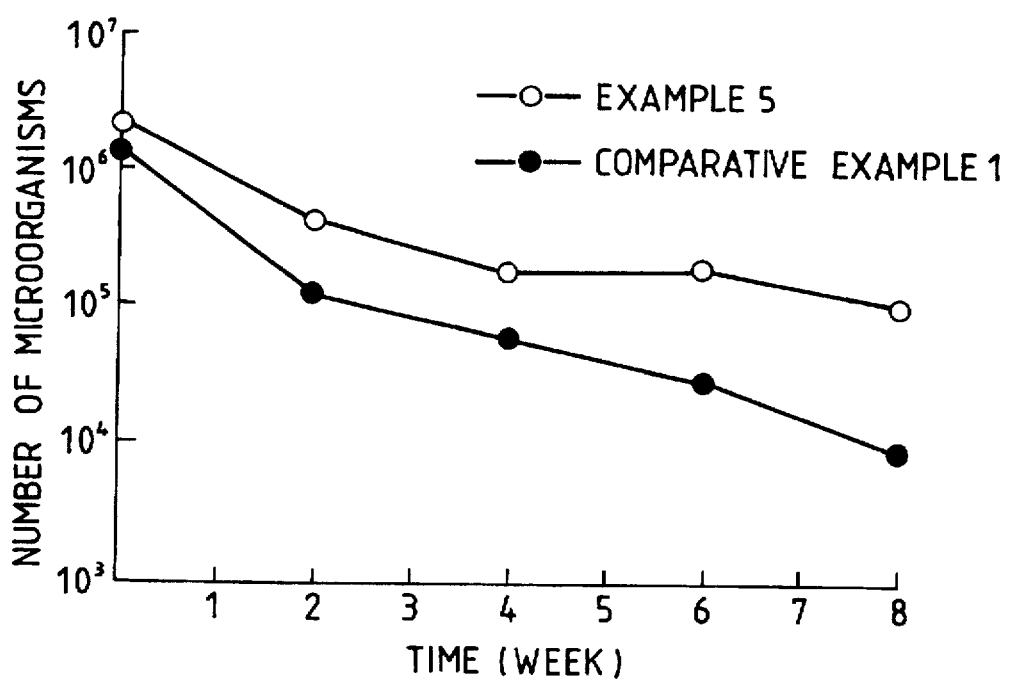
FIG. 5 is a graph showing changes of microorganism numbers in Example 5 and Comparative Example 1.

The experiments were carried out in quintuplicate, and the bacterial cell number was denoted by an average. The results of the bacterial cell number per gram of the dry soil are shown in FIG. 5.

COMPARATIVE EXAMPLE 1

A cell suspension was prepared so that the bacterial cell number determined by absorbance measurement might be the same as in Example 1, and three liters of it (not including the aggregate forming agent) was sprinkled in a test soil tank containing the same clay loam as in Example 1. Next, the artificial rain was sprinkled on the test soil at 2 mm/day, and during the experiment except the operation period, the test soil tank was allowed to stand under a vinyl sheet cover. Sampling of 5 g of the soil fraction and the measurement of the bacteria number were carried out in the same manner as in Example 5. The experiments were carried out in quintuplicate, and the bacteria number was denoted by an average. The results are shown in FIG. 5.

EXAMPLE 6

Figure 6:
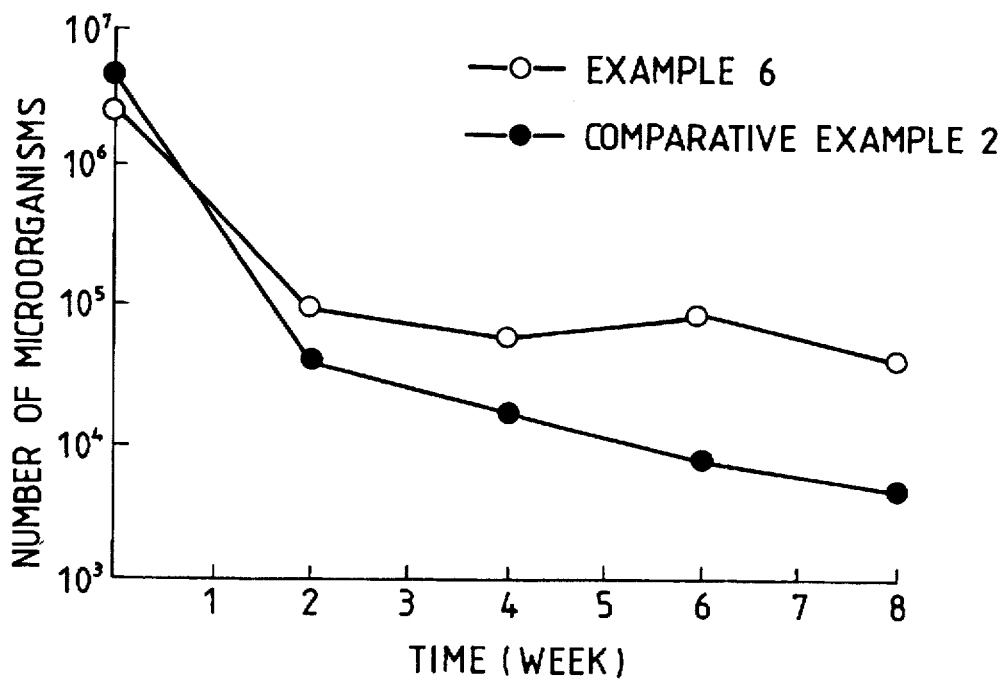
FIG. 6 is a graph showing changes of microorganism numbers in Example 6 and Comparative Example 2.

From the soil in Example 2, in which the formation of aggregates was going on, a fraction having a particle diameter of from 32 to 500 μm where the increase of the particle diameter distribution was confirmed was collected as much as 5 g every 2 weeks, the bacteria number were counted in the same manner as in Example 5. The experiments were carried out in quintuplicate, and the bacteria number was denoted by an average. The results are shown in FIG. 6.

COMPARATIVE EXAMPLE 2

A cell suspension was prepared so that the bacterial cell number determined by absorbance measurement might be the same as in Example 3, and three liters of it was sprinkled in a test soil tank containing the same clay loam as in Example 3. Next, the artificial rain was sprinkled on the test soil so as to be 2 mm/day. During the experiment except this operation period, the test soil tank was allowed to stand under a vinyl sheet cover. Every 2 weeks collection of 5 g of the soil and the measurement of the bacterial cell number were carried out in the same manner as in Example 5. The experiments were carried out in quintuplicate, and the bacteria number was denoted by an average. The results are shown in FIG. 6.

EXAMPLE 7

Figure 7:
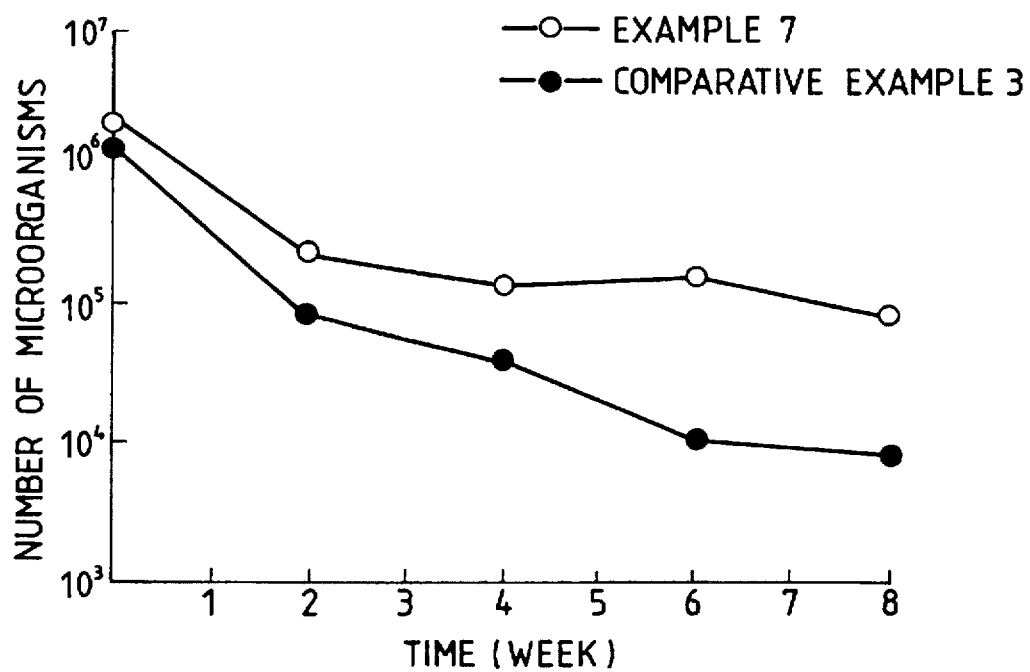
FIG. 7 is a graph showing changes of microorganism numbers in Example 7 and Comparative Example 3.

From the soil in Example 3, in which the formation of aggregates was going on, a fraction having a particle diameter of from 32 to 500 μm where the increase of the particle diameter distribution was confirmed was collected as much as 5 g every 2 weeks, the bacteria number were counted in the same manner as in Example 5. The experiments were carried out in quintuplicate, and the bacteria number was denoted by an average. The results are shown in FIG. 7.

COMPARATIVE EXAMPLE 3

A cell suspension was prepared so that the cell number determined by absorbance measurement might be the same as in Example 3, and three liters of it was sprinkled in a test soil tank containing the same clay loam as in Example 3. Next, the artificial rain was sprinkled on the test soil so as to be 2 mm/day. During the experiment except this operation, the test soil tank was allowed to stand under a vinyl sheet cover. Every 2 weeks, collection of 5 g of the soil and the measurement of the bacterial cell number were carried out in the same manner as in Example 5. The experiments were carried out in quintuplicate, and the bacteria number was denoted by an average. The results are shown in FIG. 7.

EXAMPLE 8

Figure 8:
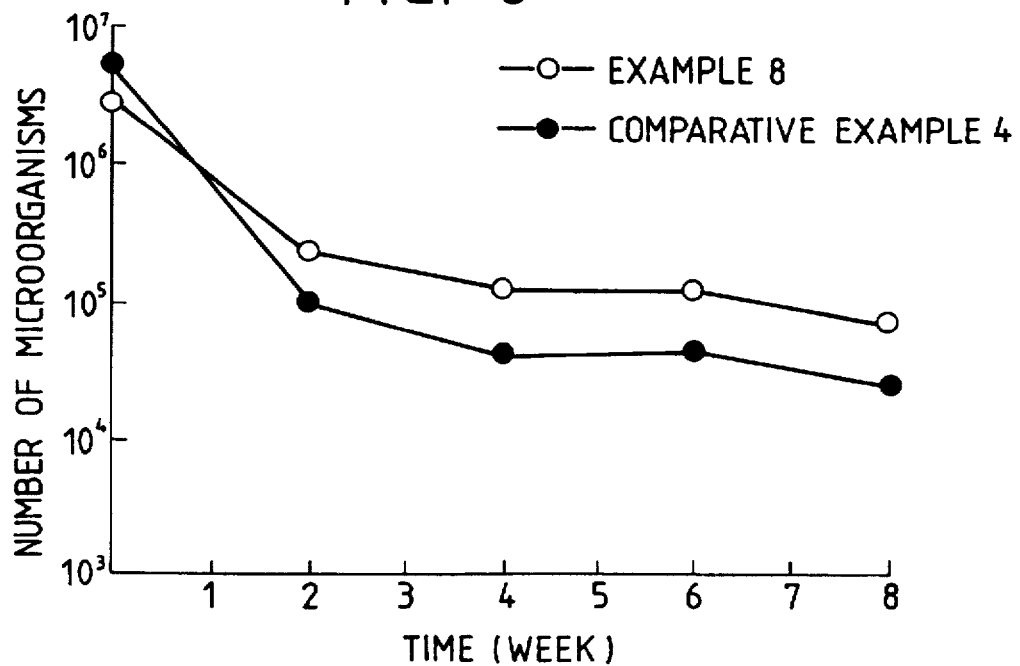
FIG. 8 is a graph showing changes of microorganism numbers in Example 8 and Comparative Example 4.

From the soil in Example 4, in which the formation of aggregates was carried out, a fraction having a particle diameter of from 32 to 500 μm which increased in the particle diameter distribution was collected as much as 5 g every 2 weeks, the bacteria number were counted in the same manner as in Example 5. The experiments were carried out in quintuplicate, and the bacteria number was denoted by an average. The results are shown in FIG. 8.

COMPARATIVE EXAMPLE 4

A cell suspension was prepared so that the bacterial cell number determined by absorbance measurement might be the same as in Example 4, and three liters of it was sprinkled in a test soil tank containing the same clay loam as in Example 4. Next, the artificial rain was sprinkled on the test soil so as to be 2 mm/day. During the experiment other than the operation, the test soil tank was allowed to stand under a vinyl sheet cover. Every 2 weeks, collection of 5 g of the soil and the measurement of the bacterial cell number were carried out in the same manner as in Example 5. The experiments were carried out in quintuplicate, and the bacteria number was denoted by an average. The results are shown in FIG. 8.

EXAMPLE 9

Figure 9:
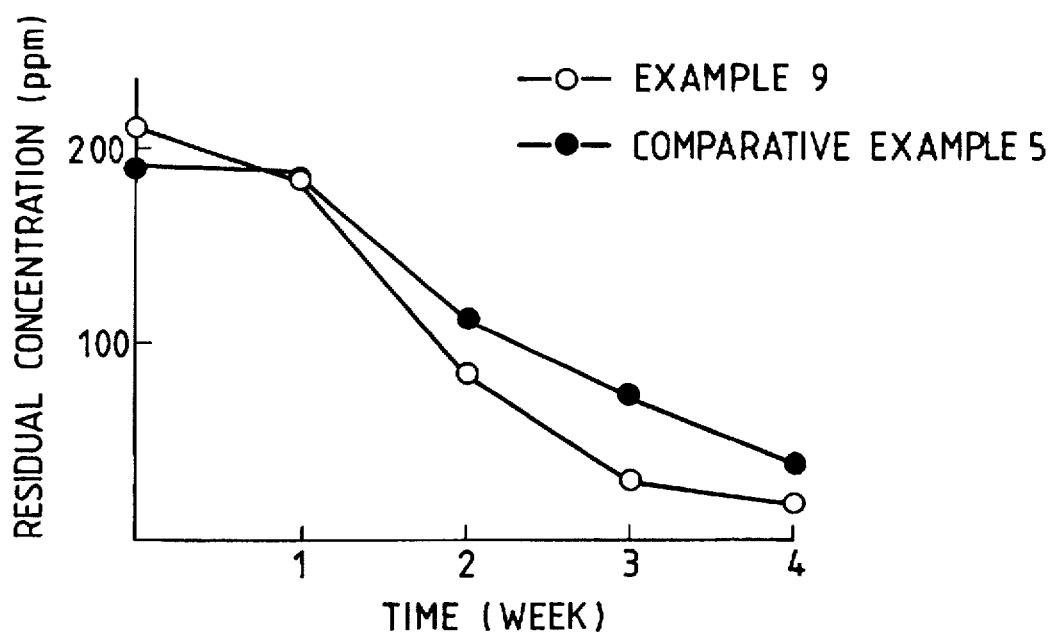
FIG. 9 is a graph showing changes of p-cresol concentrations in Example 9 and Comparative Example 5.

Test soil was prepared in the same manner as in Example 1, and p-cresol was sprinkled on this soil so that the concentration of p-cresol might be 200 ppm. Afterward, the soil polluted with p-cresol was laid in a test soil tank. Next, the bacteria suspension and the aggregate-forming agent were sprinkled on this test soil followed by the artificial rain fall as in Example 1. The soil sample was collected as much as 10 g every one week, and p-cresol was determined by p-hydrazinobenzenesulfonic acid absorptiometric method (a method prescribed in JIS K 0102). The experiments were carried out in quintuplicate, and the concentration of p-cresol was denoted by an average. The concentration change of the remaining p-cresol are shown in FIG. 9.

COMPARATIVE EXAMPLE 5

A cell suspension was prepared so that the bacterial cell number determined by absorbance measurement might be the same as in Example 9, and three liters of it was sprinkled in a test soil tank containing the same clay loam as in Example 1. Next, the artificial rain was sprinkled on the test soil so as to be 2 mm/day. During the experiment other than the operation, the test soil tank was allowed to stand under a vinyl sheet cover. Every 2 weeks, collection of 10 g of the soil and the measurement of p-cresol concentration were carried out in the same manner as in Example 9. The experiments were carried out in quintuplicate, and the concentration was denoted by an average. The results are shown in FIG. 9.

EXAMPLE 10

The test soil was prepared in the same manner as in Example 4, and p-cresol was sprinkled on this soil so that the concentration of p-cresol might be 200 ppm. Afterward, the soil polluted with p-cresol was laid in a test soil tank. Next, the bacteria suspension and the aggregate-forming agent were sprinkled on this test soil followed by the artificial rain fall as in Example 4.

Figure 10:
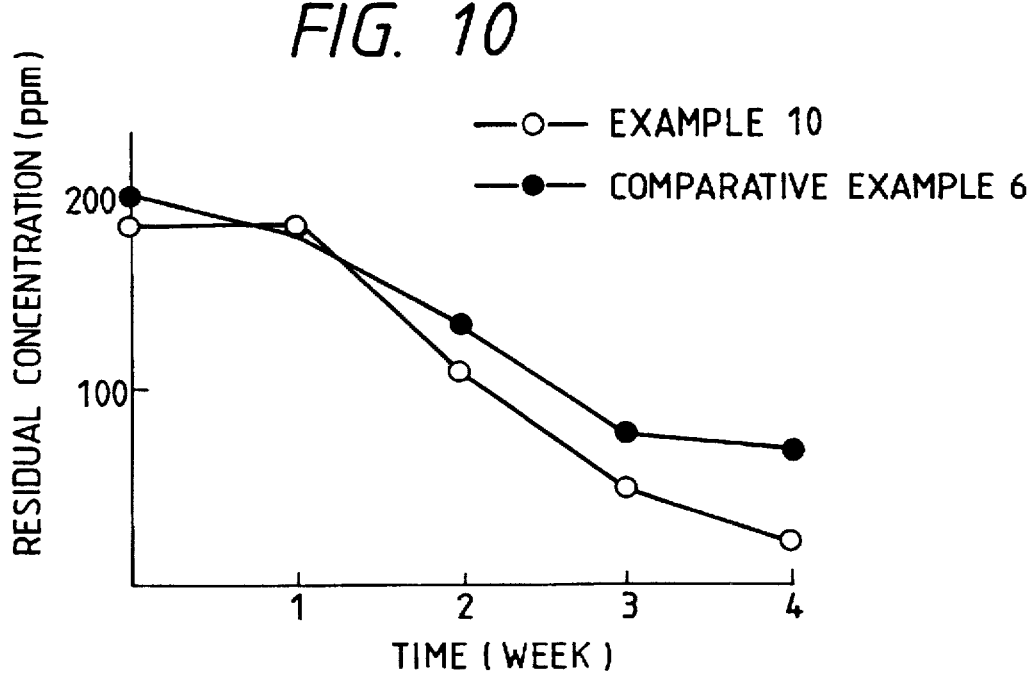
FIG. 10 is a graph showing changes of p-cresol concentrations in Example 10 and Comparative Example 6.

This soil was sampled as much as 10 g every one weak, and p-cresol concentration was determined by p-hydrazinobenzenesulfonic acid absorptiometric method. The experiments were carried out in quintuplicate, and the concentration of p-cresol was denoted by an average. The results are shown in FIG. 10.

COMPARATIVE EXAMPLE 6

A cell suspension was prepared so that the bacterial cell number determined by absorbance measurement might be the same as in the aggregate-forming agent in Example 10, and three liters of it was sprinkled in a test soil tank containing the same clay loam as in Example 10. Next, an artificial rain was sprinkled on the test soil so as to be 2 mm/day. During the experiment except this operation, the test soil tank was allowed to stand under a vinyl sheet cover. Every 2 weeks, collection of 10 g of the soil and the measurement of p-cresol concentration were carried out in the same manner as in Example 10. The experiments were carried out in quintuplicate, and the concentration was denoted by an average. The results are shown in FIG. 10.

EXAMPLE 11

Pseudomonas cepacia KK01 (BP-4235) was inoculated into 10 ml of M9 culture medium (including 0.05% of yeast extract), and precultured at 30° C., the cells were transferred to 3 liters of the culture medium and the main culture was then carried out therein. After OD reached about 0.7, clay mineral montmorillonite (Kunipia F, made by Kunimine Industry Co., Ltd., particle diameter distribution=0.5–10 μm, average particle diameter=2 μm) which is the main component of bentonite was added as fine particles to this liquid so that the concentration of the montmorillonite became 0.01%.

Next, to the mixture in which the montmorillonite adsorbing the above-mentioned bacteria was dispersed, sucrose and wheat flour were added as adhesives so that the concentration of each of the sucrose and wheat flour might be 0.1%, forming a cell suspension containing the aggregate-forming agent.

Figure 11:
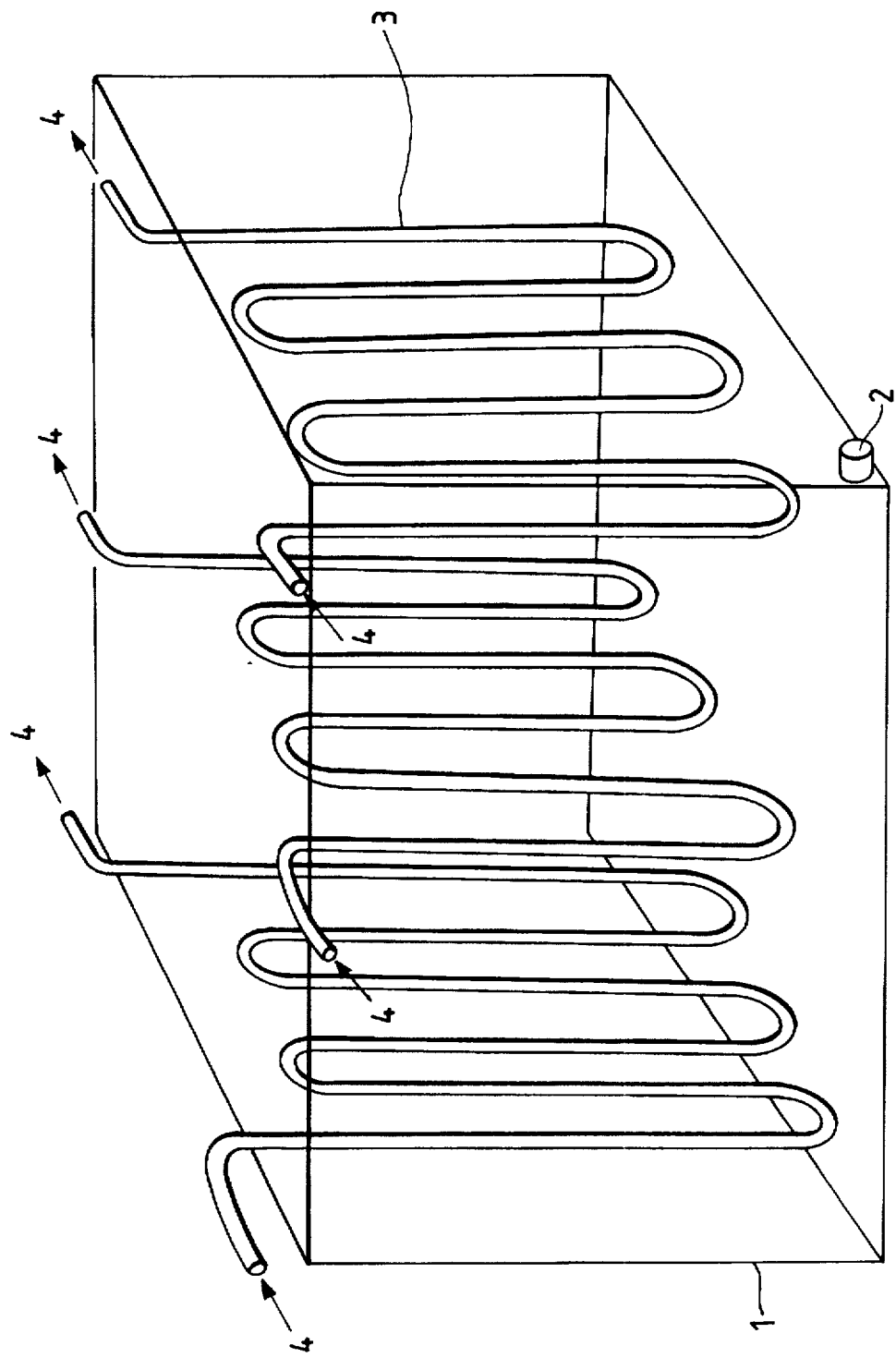
FIG. 11 is a schematic view of a soil tank used in Example 11.

For an experiment using soil, an one meter long, one meter wide, and one meter deep stainless steel lysimeter equipped with a drain at the bottom thereof and connected to a thermostatic circulating device (Thermoelite BH81 model, made by Yamato Science Co., Ltd.) via a stainless steel pipe having a diameter of 20 mm was used as a soil tank. This soil tank and a heater are shown in FIG. 11. In this soil tank, clay loam containing 37.5 to 50% of clay mineral was laid, while the soil was sufficiently stirred so that the composition of the soil might be uniform, thus forming the test soil.

On this test soil, 3 liters of the above-mentioned cell suspension containing the aggregate-forming agent including 0.1% of sucrose and 0.1% of wheat flour was sprinkled, where warm water at 35° C. was always run in the water pipe at a rate of about 5 liters/hour. Five liters of water was sprinkled on the soil every 2 days using a sprinkling can.

Three liters of the aggregate forming agent were sprinkled every 7 days. Except for this operation period, the test tank was allowed to stand outdoor under airy, rain-shielding conditions. Particle diameter distribution of the aggregates was measured at an interval of 7 days.

This particle diameter distribution of the aggregates was determined by sampling 50 g of the soil from the soil tank, sieving the sample successively through 8.6 mesh (2 mm), 30 mesh (500 μm), 100 mesh (150 μm) and 440 mesh (32 μm) sieves, and then measuring the weights of the soil fractions having the respective particle diameters. This measurement was carried out in quintuplicate, and an average was taken.

Figure 12:
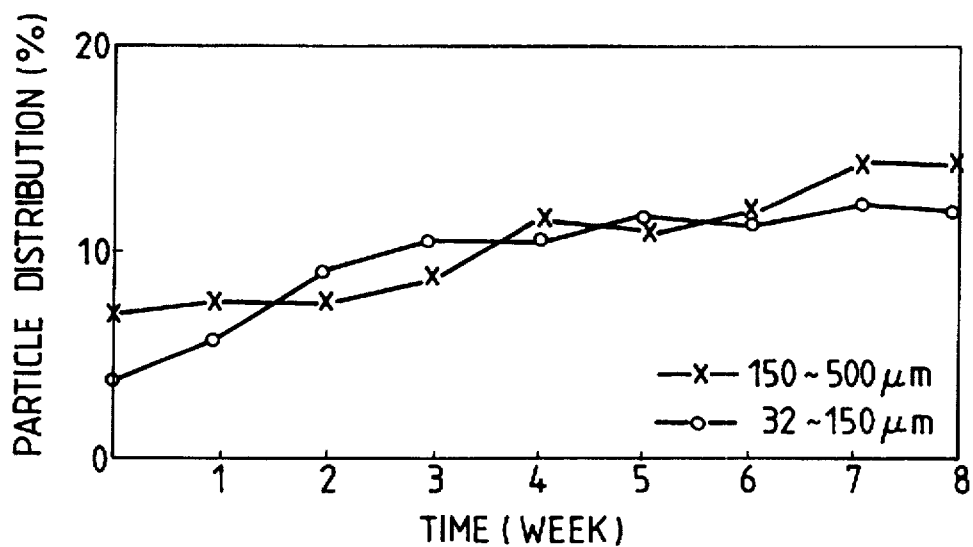
FIG. 12 is a graph showing change of soil particle diameter distribution in Example 11.

As a result, the weight ratio of the soil aggregates having a particle diameter of from 32 to 500 μm increased, confirming the aggregate formation. FIG. 12 shows the change of the weight ratios (%) in which the particle diameter increase is confirmed.

EXAMPLE 12

According to the same procedure as in Example 11 except that the content of wheat flour in the aggregate-forming agent was 0.5%, sprinkling was conducted on the same kind of test soil as in Example 11, and the soil was then stirred. This stirring was achieved by digging the test soil by using a shovel and a motorized gyro equipped with stirring blades. After the stirring, water was sprinkled as the artificial rain on the soil so as to be 5 mm/day using a sprinkling can.

Figure 13:
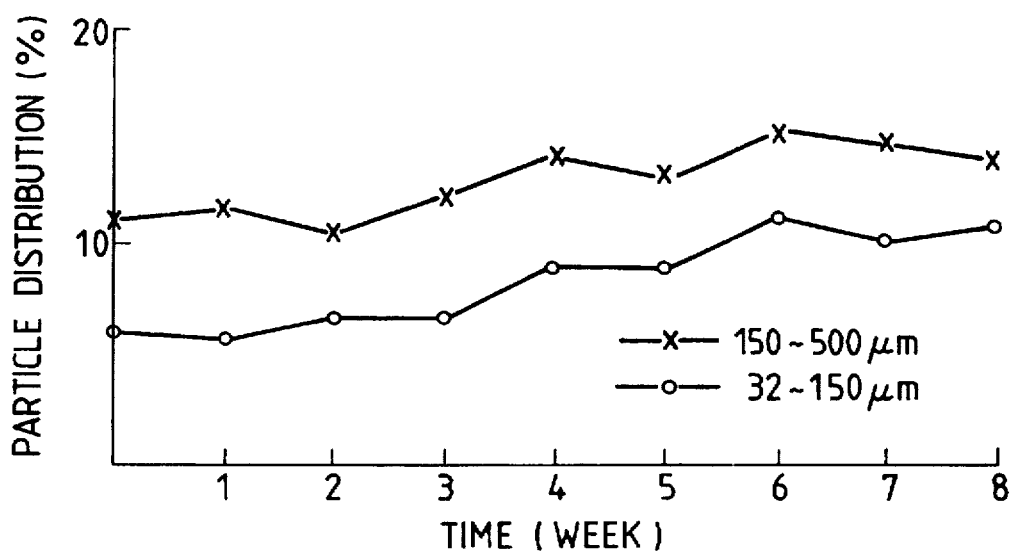
FIG. 13 is a graph showing change of soil particle diameter distribution in Example 12.

The test soil tank was allowed to stand under a vinyl sheet cover, and application of the aggregate forming agent and the artificial rain fall and soil stirring were carried out followed by the measurement of the aggregate formation at an interval of 7 days. The particle diameter distribution of the aggregates was determined by sampling 50 g of the soil from the soil tank, and the measurement of the particle diameter distribution was carried out as in Example 11. As a result, the weight ratio of soil aggregates having a particle diameter of from 32 to 500 μm increased, thus confirming the formation of aggregates. FIG. 13 shows the results of the weight ratios (%) in which the particle diameter increase is seen.

EXAMPLE 13

Figure 64:
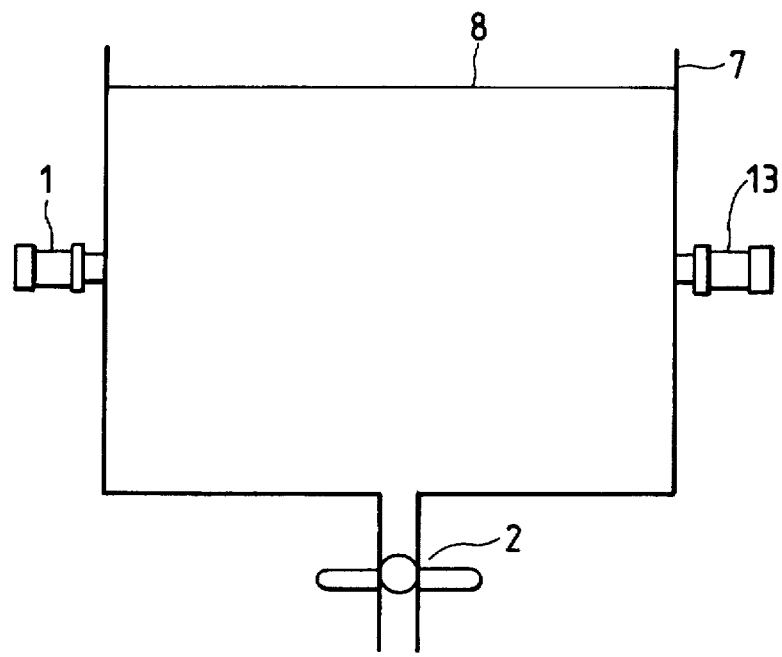
FIG. 64 is a schematic view of a lysimeter equipped with a vibknocker in Example 13.

A cell suspension containing the aggregate forming agent was prepared in the same manner as in Example 11 except that the amount of M9 culture medium was made 11 ml, the content of montmorillonite was 0.02%, and each content of sucrose and wheat flour was 0.2%. Furthermore, the soil tank was equipped with two vibknockers (WK100P, made by Exen Co., Ltd.) (FIG. 64). The same kind of the test soil as in Example 11 was used except that the clay loam contained 37.5 to 50% of clay mineral.

After the above-mentioned suspension was sprinkled on this test soil as in Example 11, vibration was applied to the soil. This vibration was applied for 20 minutes under a pressure of 7 kgf/cm$^2$ at a strike cycle of 60 frequencies/minute with a strike energy of 20.5 kgfm by the use of the above-mentioned knocker. After the vibration, water was sprinkled as the artificial rain on the soil so as to be 5 mm/day using a sprinkling can.

Figure 14:
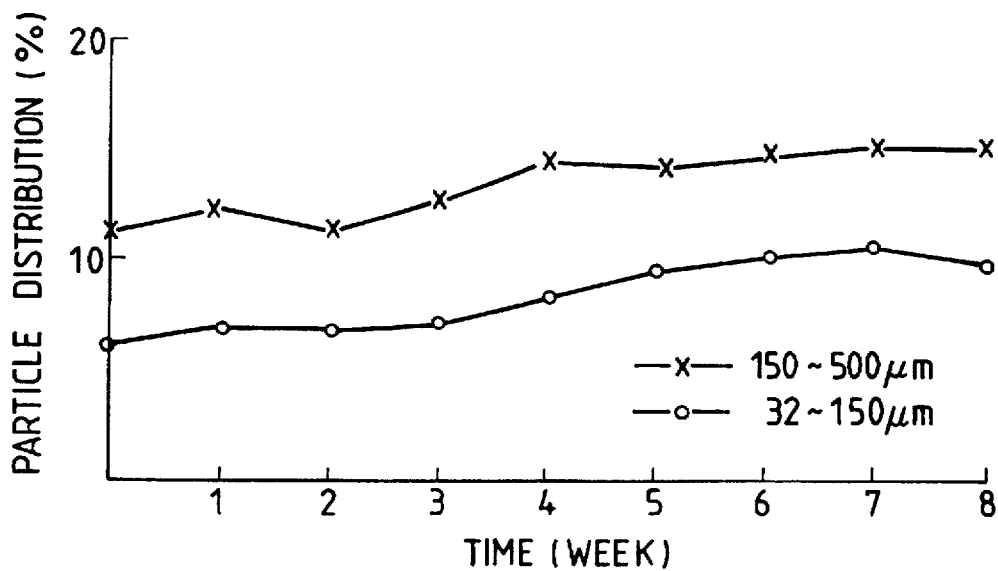
FIG. 14 is a graph showing change of soil particle diameter distribution in Example 13.

Afterward, the test tank was allowed to stand under a vinyl sheet cover, and every 7 days the aggregate forming agent was sprinkled and the particle diameter distribution of the aggregates was measured in the same manner as in Example 2. The results are shown in FIG. 14.

EXAMPLE 14

Figure 65:
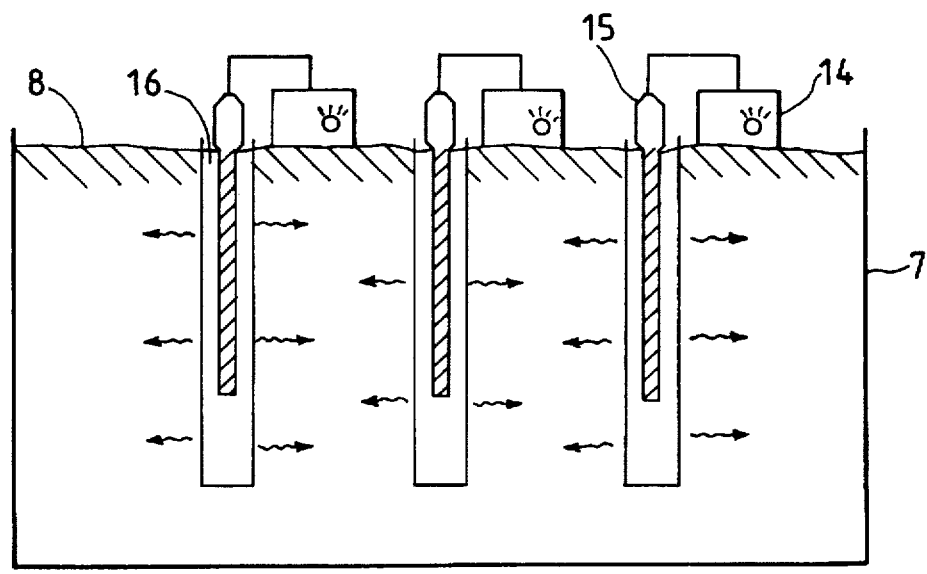
FIG. 65 is a schematic view of a lysimeter equipped with a cylinder into which an ultrasonic homogenizer is inserted.

A cell suspension containing an aggregate-forming agent was prepared by the same procedure as in Example 13 except that the amount of M9 culture medium was 10 ml, montmorillonite was replaced with kaolin, and wheat flour was replaced with dextrin. The test soil tank was prepared in the same manner as in Example 13 except that the longitudinal length of the lysimeter was 2 m and no vibknockers were attached (FIG. 65). Into this test soil, wells having a diameter of 10 cm and a depth of 50 cm were formed at an interval of 50 cm, and the wells were filled with water, and ultrasonic homogenizers (Sonifyer II, model 900, made by Branson Co., Ltd.) were inserted.

After three liters of the above-mentioned cell suspension containing the aggregate-forming agent were sprinkled on this test soil, water was sprinkled as the artificial rain on the soil so as to be 20 mm/day by a sprinkling can. After the water sprinkle, the soil was subjected to ultrasonic treatment for 30 minutes at a frequency of 20 KHz at an output of 900 W by the use of the above-mentioned ultrasonic homogenizer.

Figure 15:
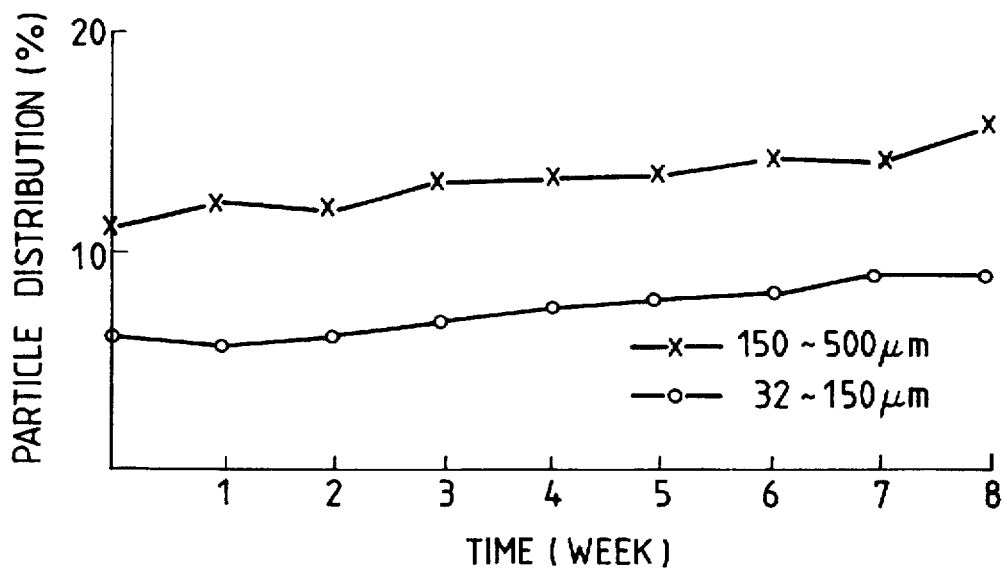
FIG. 15 is a graph showing change of soil particle diameter distribution in Example 14.

Afterward, the test soil tank was allowed to stand under a vinyl sheet cover, and every 7 days 3 liters of the aggregate forming agent were sprinkled and the particle diameter distribution of the aggregates was measured in the same manner as in Example 12. The results are shown in FIG. 15.

EXAMPLE 15

An aggregate-forming agent containing 0.2% allophane as fine particles, 0.1% sucrose and 0.1% dextrin as adhesives in water was prepared.

For an experiment of soil, the same lysimeter as in Example 11 was installed as a soil tank. In this soil tank, the clay loam containing 37.5 to 50% of clay mineral was laid and the soil was sufficiently stirred so that the composition of the soil might be uniform, thereby forming a test soil.

Figure 16:
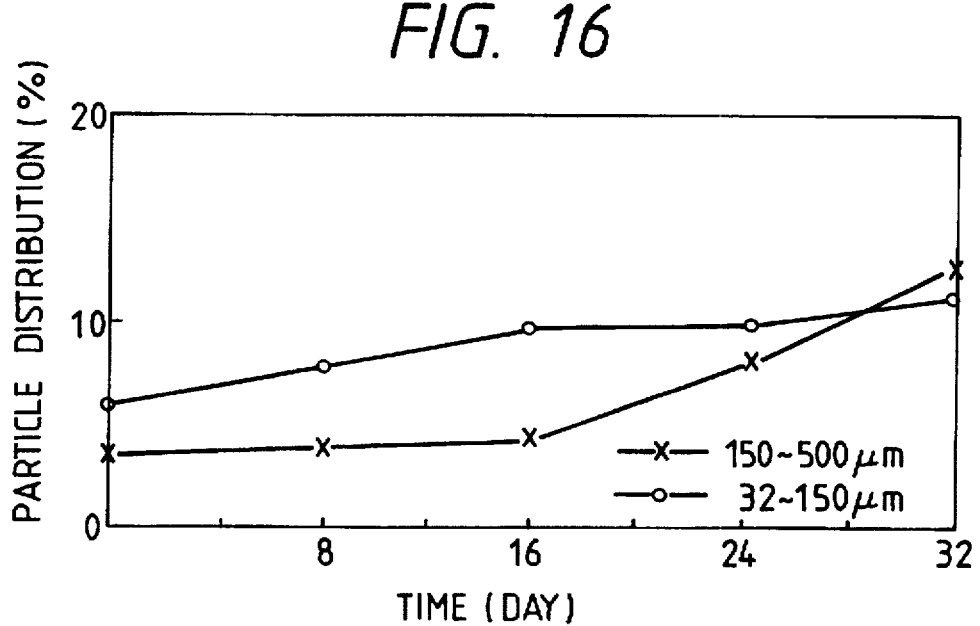
FIG. 16 is a graph showing change of soil particle diameter distribution in Example 15.

On this test soil, 20 liters of the above-mentioned aggregate-forming agent not containing microorganisms were uniformly sprinkled using a sprinkling can, and the test soil tank was then left standing at 20° C. for 24 hours. Next, the temperature of the temperature-controlled chamber was dropped to −5° C., and the soil tank was then allowed to stand for 24 hours. Afterward, maintaining the temperature at −5° C., the moisture in the low-temperature chamber was set to 10%, and the soil tank was then left standing for 5 days. On the sixth day, the set temperature was raised up to 20° C., while the moisture was maintained at 10%, and the soil tank was then allowed to stand for 24 hours. The operation cycle of 8 days from the sprinkle of the aggregate-forming agent to the drying step was repeated 4 times, and the soil immediately before the sprinkle of the aggregate-forming agent was sampled at an interval of 8 days to measure the particle diameter distribution of the aggregates in the same manner as in Example 11. As a result, the weight ratio of the soil aggregates having a particle diameter of from 32 to 500 μm increased, confirming the formation of the aggregates. FIG. 16 shows the results of the weight ratios (%) in which the particle diameter increases.

EXAMPLE 16

Figure 17:
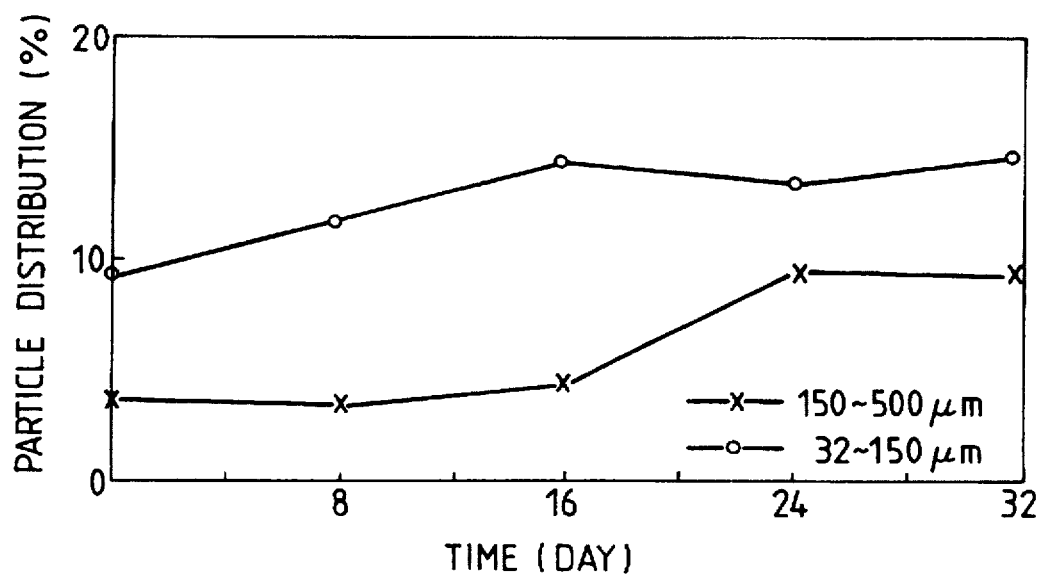
FIG. 17 is a graph showing change of soil particle diameter distribution in Example 16.

According to the same procedure as in Example 15 except that 0.1% of montmorillonite was used as fine particles and 0.1% of dextrin and 0.1% of ethyl cellulose were used as adhesives in the aggregate-forming agent, 20 liters of the aggregate-forming agent were sprinkled in a test soil tank (clay loam), and the particle diameter distribution of the soil was then measured. The results are shown in FIG. 17.

EXAMPLE 17

An aggregate-forming agent was prepared by adding 1% of zeolite as fine particles, and 0.1% of lactose and 0.1% of viscose as additives.

Four stainless steel containers with lids having an outer diameter of 100 mm and a length of 800 mm were placed as refrigerant tanks in the same lysimeter as in Example 15, and 4 vinyl chloride tubes having an outer diameter of 50 mm and a length of 1000 mm and having many aeration pits were provided, thereby preparing a soil tank.

As the test soil, sand loam containing clay mineral at from 12.5 to 25%, and this test soil was laid in the same soil tank as in Example 15. Next, 20 liters of the above-mentioned aggregate-forming agent was sprinkled in the test soil tank, and after the soil tank was allowed to stand for 24 hours, each of the refrigerant tanks was filled with about 5 kg of dry ice and the soil tank was then allowed to stand for 24 hours. Afterward, a drier was arranged above the soil tank, and the soil tank and the drier were all covered with a vinyl sheet, followed by drying for 5 days. During this period, dry ice was replenished so that the refrigerant tanks were always filled with dry ice. On the sixth day, dry ice was drawn, and the soil tank was then allowed to stand at room temperature for 24 hours. The above-mentioned serial steps of 8 days was repeated 4 times, and the soil immediately before the sprinkle of the aggregate-forming agent was sampled to measure the particle diameter distribution of the aggregates.

Figure 18:
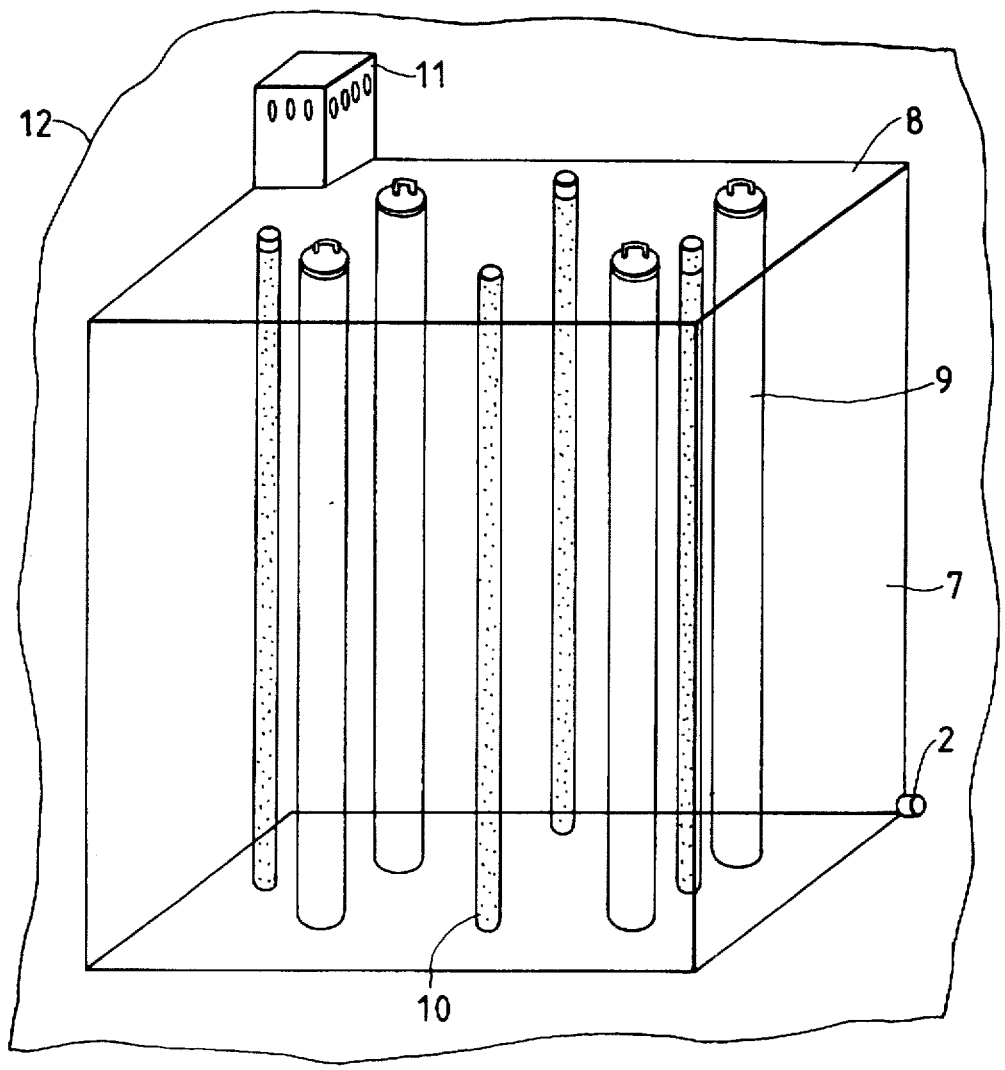
FIG. 18 is a schematic view of an experimental soil tank used in Example 17.
Figure 19:
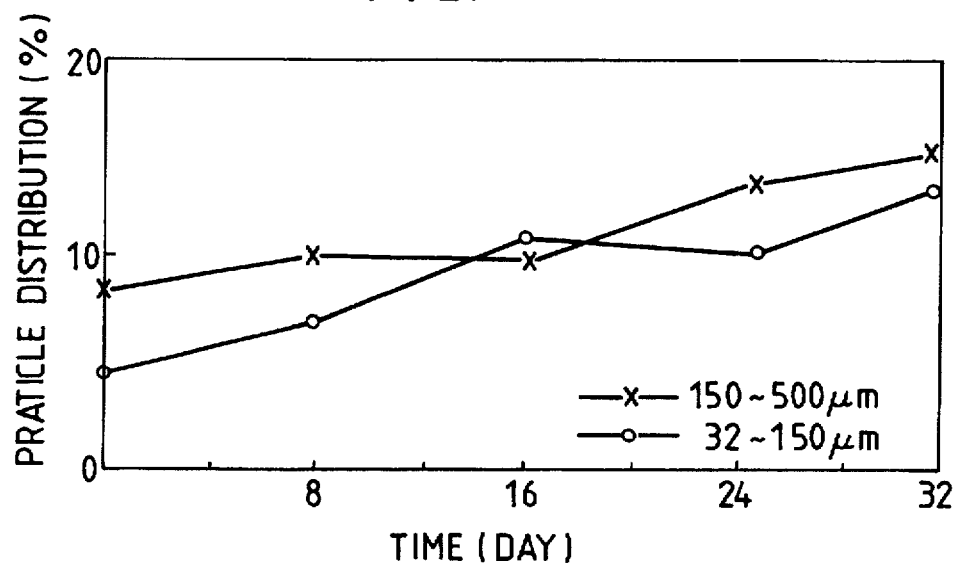
FIG. 19 is a graph showing change of soil particle diameter distribution in Example 17.

The measurement of the particle diameter distribution was carried out in the same manner as in Example 15. The soil tank used herein is shown in FIG. 18, and the results are shown in FIG. 19.

EXAMPLE 18

Figure 20:
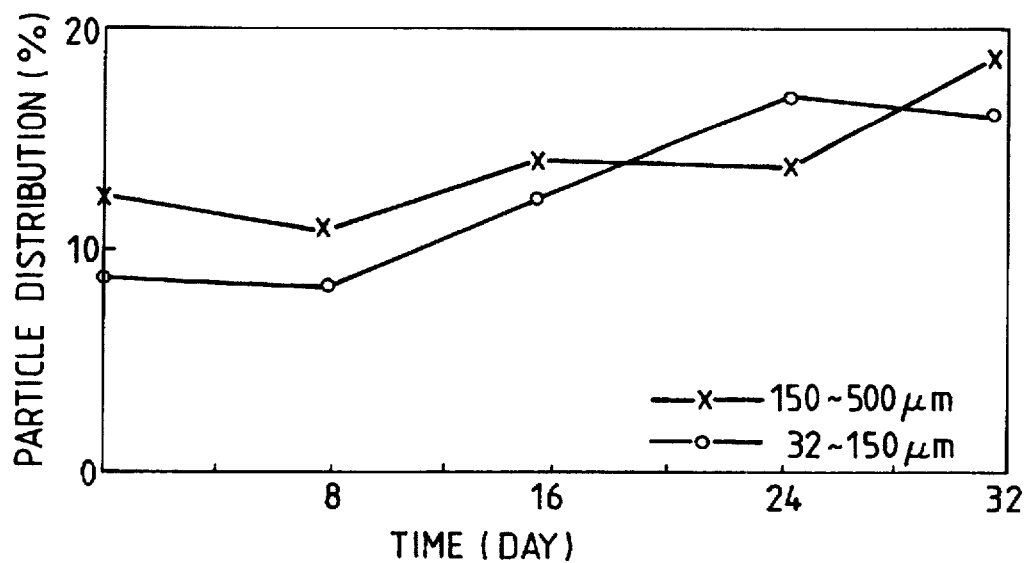
FIG. 20 is a graph showing change of soil particle diameter distribution in Example 18.
Figure 21:
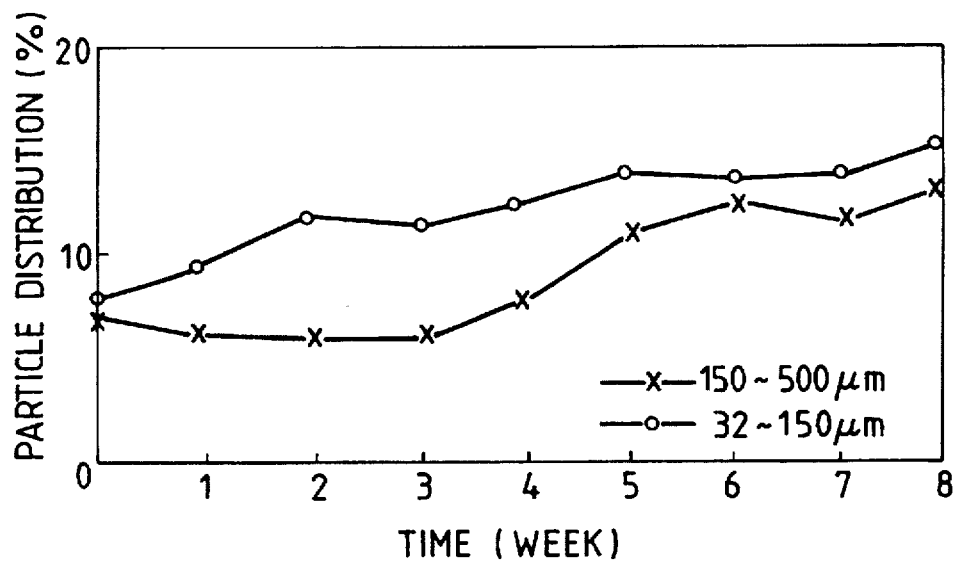
FIG. 21 is a graph showing change of soil particle diameter distribution in Example 19.
Figure 22:
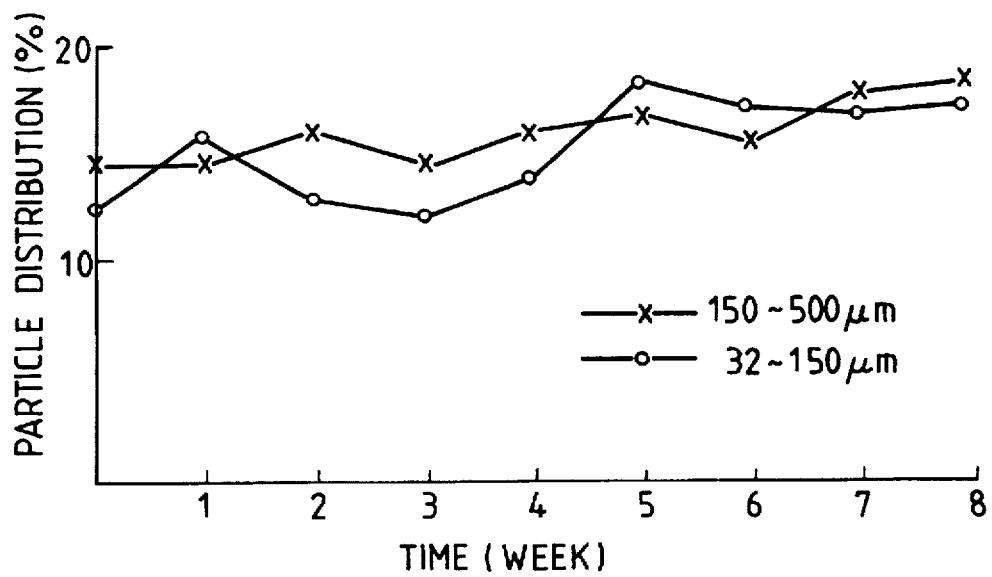
FIG. 22 is a graph showing change of soil particle diameter distribution in Example 20.
Figure 23:
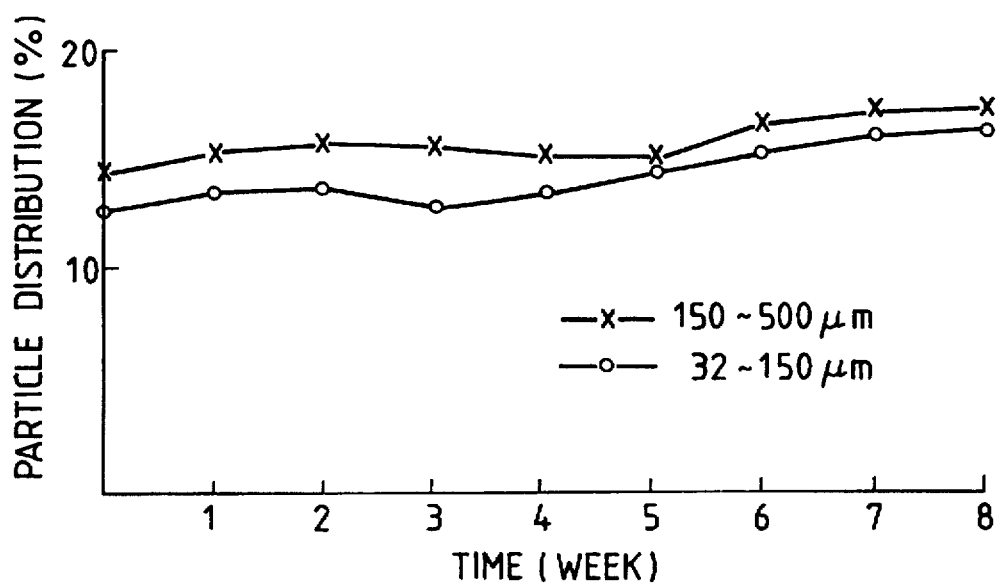
FIG. 23 is a graph showing change of soil particle diameter distribution in Example 21.
Figure 24:
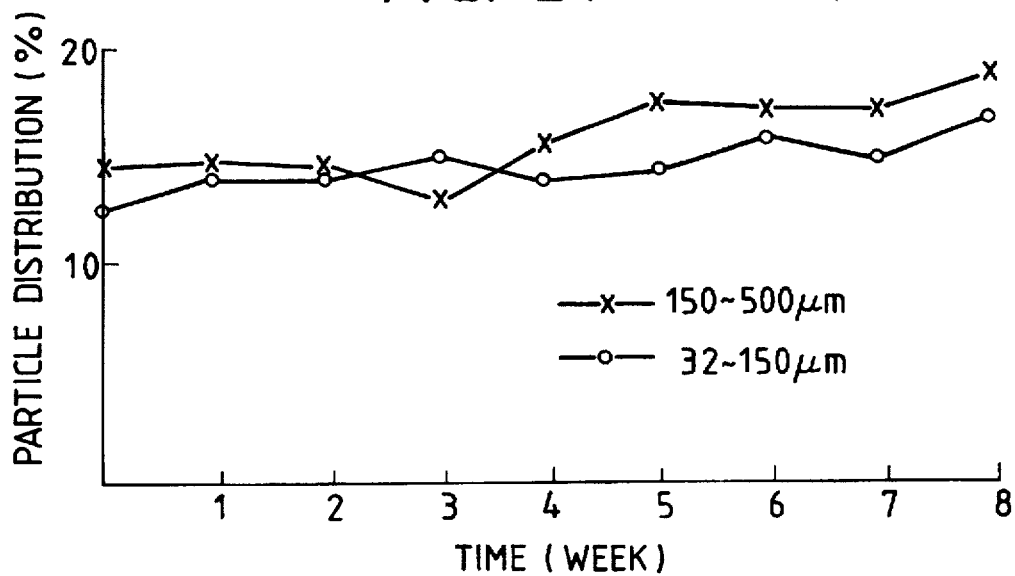
FIG. 24 is a graph showing change of soil particle diameter distribution in Example 22.

An aggregate-forming agent containing 1% of montmorillonite as fine particles as well as 0.1% of sucrose and 0.1% of dextrin as the adhesives was prepared. The same experiment as in Example 17 was carried out except that in the test soil used herein, the clay mineral content was in the range of from 25 to 37.5%, a refrigerant tank was set at the center of the test soil, and liquid nitrogen was used as the refrigerant. In the soil tank, 20 liters of the aggregate-forming agent were sprinkled, and liquid nitrogen was replenished (about 30 liters/day) to the refrigerant tank so that liquid nitrogen was always present in the refrigerant tank. Under these conditions, the same experiment as in Example 17 was carried out to measure the particle diameter distribution of the aggregates. The measurement of the particle diameter distribution was carried out in quintuplicate, and an average of the thus measured values was taken. The results are shown in FIG. 20.

EXAMPLES 19 TO 22

The same experiments as in Examples 11, 12, 13 and 14 were carried out using *Bacillus subtilis* ISW 1214 (they were Examples 19, 20, 21 and 22, respectively). In these experiments, fine particles in the aggregate-forming agent were 0.01% podzol soil, and as adhesives, 0.1% of sucrose and 0.1% of cellulose were used in Example 19 and 20; 0.1% of dextrin and 0.1% of cellulose were used in Example 21; and 0.1% of dextrin and 0.1% of ethyl cellulose were used in Example 22.

The same procedures were carried out as in Examples 11 to 14 respectively (however, in Example 15, water was sprinkled in an amount of 10 liters/3 days), and the particle diameter distribution of the soil was measured. This measurement was carried out in quintuplicate, and an average was taken. The results are shown in FIGS. 21 to 24, respectively, and the formation of the aggregates is confirmed as in Examples 11 to 14.

EXAMPLE 23

Figure 25:
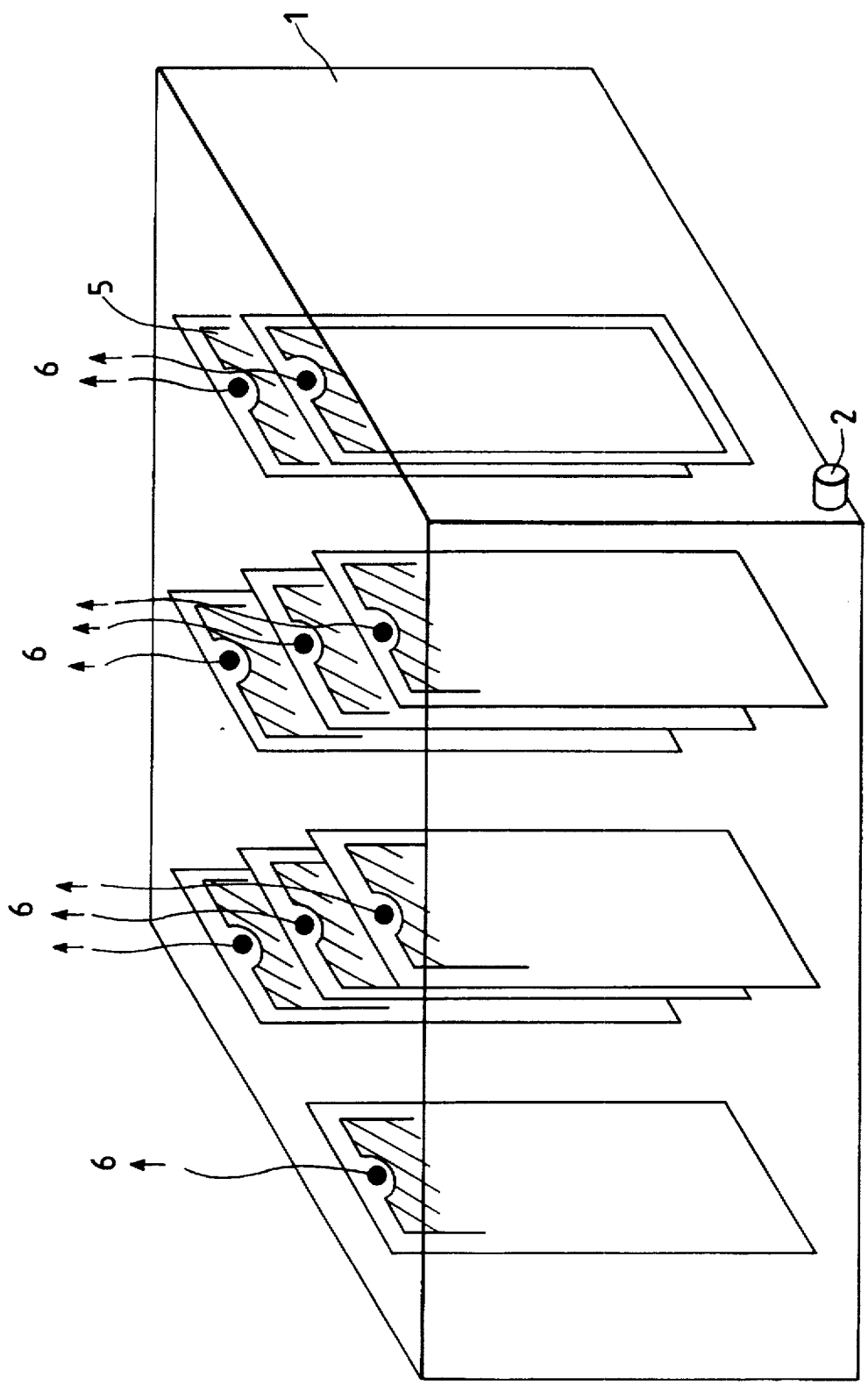
FIG. 25 is a schematic view of a heating experiment using a soil tank and panel heaters in Example 23.

The same experiment as in Example 11 was carried out, using *Saccharomyces cerevisiae* YPH 499 mating type MAT a. In the same soil tank as used in Example 11 except that a stainless steel pipe for water supply was eliminated, there was laid sand loam containing clay mineral at from 12.5 to 25%, with sufficient stirring of the soil so that the composition of the soil might be uniform, thereby forming the test soil. Next, panel heaters (submerged heaters, made by Iuchi Co., Ltd., 200V-2K, 340×750 mm) were buried in the soil-containing soil tank at an interval of 20 cm, and the soil was always heated at 30° C. The heating experiment using the heaters is shown in FIG. 25.

Figure 26:
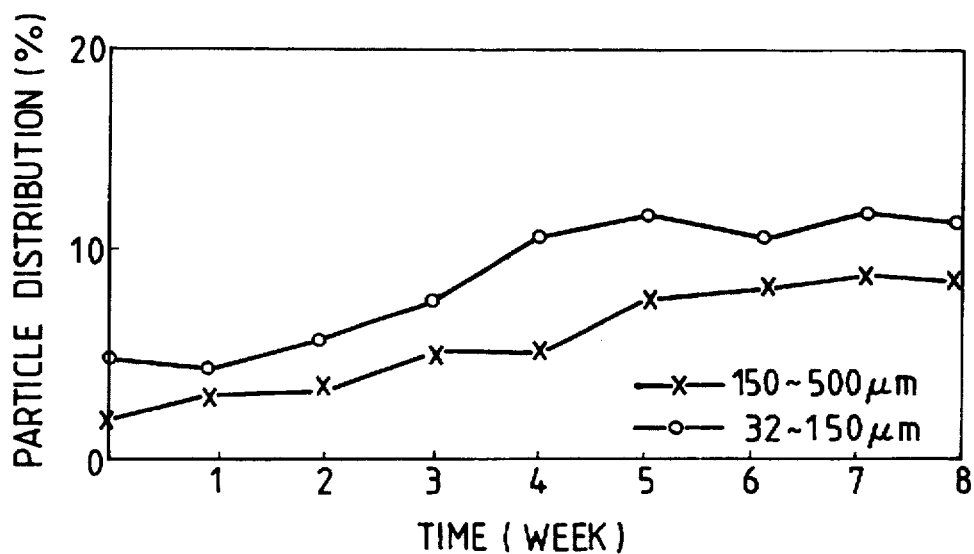
FIG. 26 is a graph showing change of soil particle diameter distribution in Example 23.

As fine particles in the aggregate-forming agent, 0.01% of montmorillonite was used, and as adhesives, 0.1% of sucrose and 0.1% of cellulose were used. As in Example 11, 3 liters of the aggregate-forming agent were sprinkled and about 5 liters of water were then sprinkled on the test soil every 3 days using a sprinkling can. Except this operation, the test soil tank was allowed to stand outdoor where was airy and protected from rain, and the particle diameter distribution of the aggregates was measured. The measurement of the particle diameter distribution was carried out in quintuplicate, and an average was taken. The results are shown in FIG. 26.

EXAMPLE 24

Figure 27:
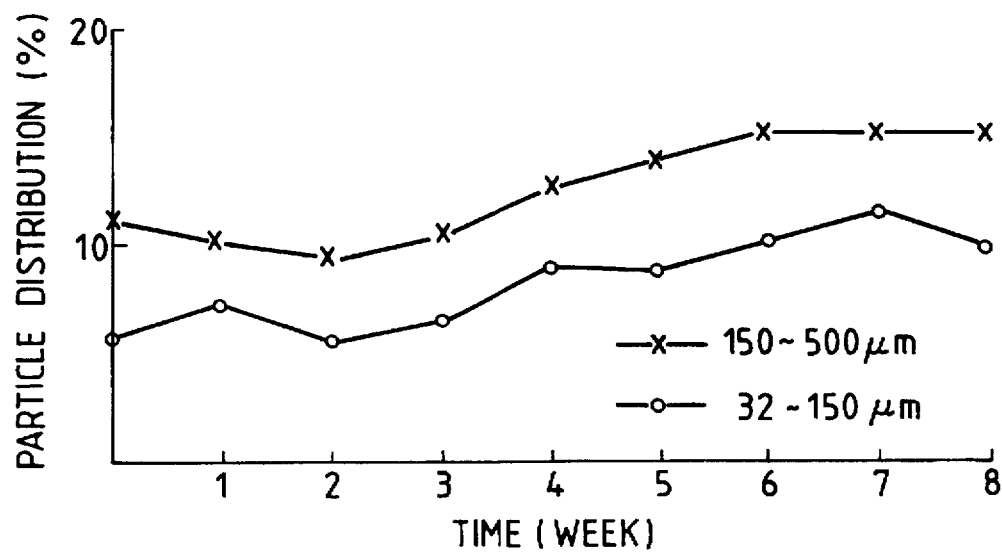
FIG. 27 is a graph showing change of soil particle diameter distribution in Example 24.

The same experiment as in Example 12 was carried out, using *Saccharomyces cerevisiae* YPH 499 mating type MAT a. As the fine particles in the aggregate-forming agent, 0.05% of montmorillonite was used, and as the adhesive, 0.6% of cellulose was used. As in Example 12, the cell suspension and the aggregate-forming agent were sprinkled on the test soil, and the particle diameter distribution of the resulting aggregates was measured. In this case, the clay mineral content in the test soil was in the range of from 12.5 to 25%. The results are shown in FIG. 27. From this drawing, the formation of the aggregates was confirmed as in Example 12.

EXAMPLE 25

A procedure similar to Example 13 was carried out, but in this case, *Saccharomyces cerevisiae* YPH 499 mating type MAT a was cultured in 15 ml of M9 medium, and the main culture was carried out in 5 liters of the culture medium. As the adhesive, 0.1% of lactose and 0.2% of methyl cellulose were added as additives, thereby preparing the aggregate-forming agent.

A space of 2 m wide, 2 m long and 3 m deep from the ground surface was filled with sand loam (clay mineral content=12.5 to 25%) until the depth of 0.5 m from the ground surface.

Figure 28:
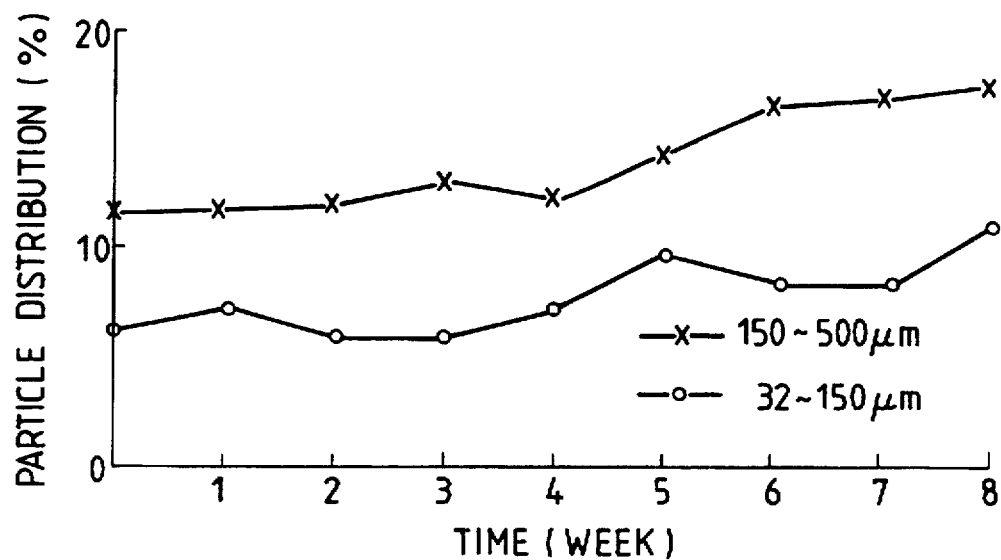
FIG. 28 is a graph showing change of soil particle diameter distribution in Example 25.
Figure 29:
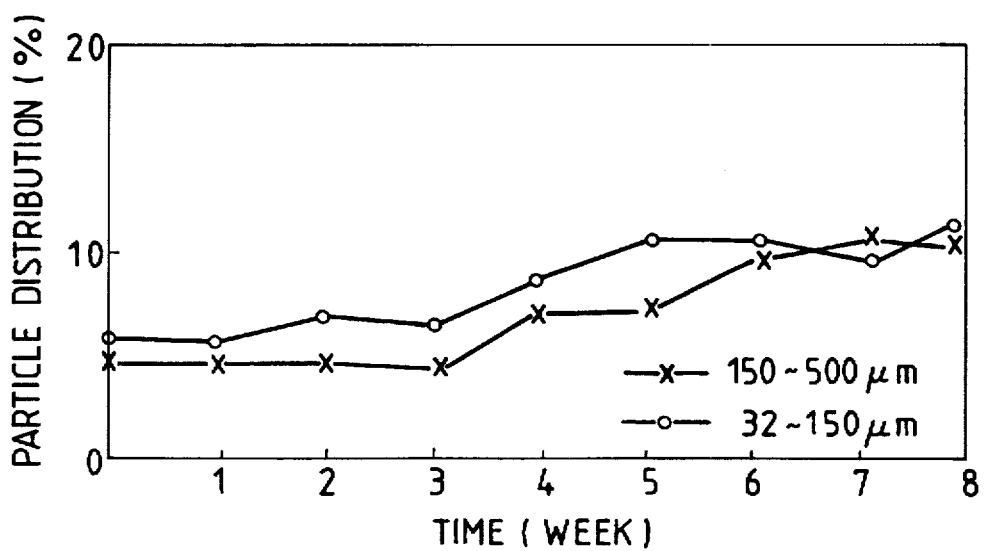
FIG. 29 is a graph showing change of soil particle diameter distribution in Example 26.
Figure 30:
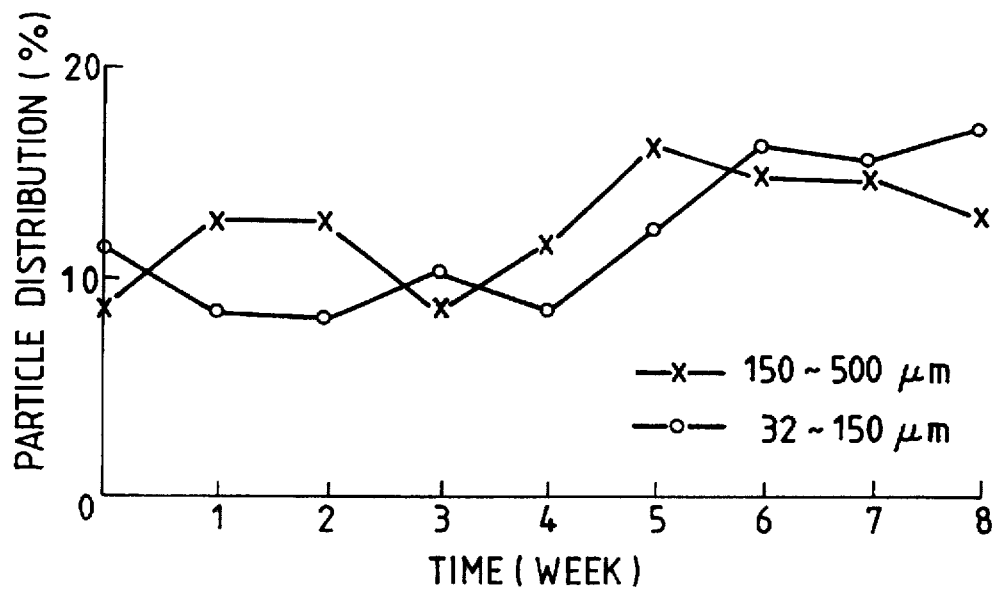
FIG. 30 is a graph showing change of soil particle diameter distribution in Example 27.
Figure 31:
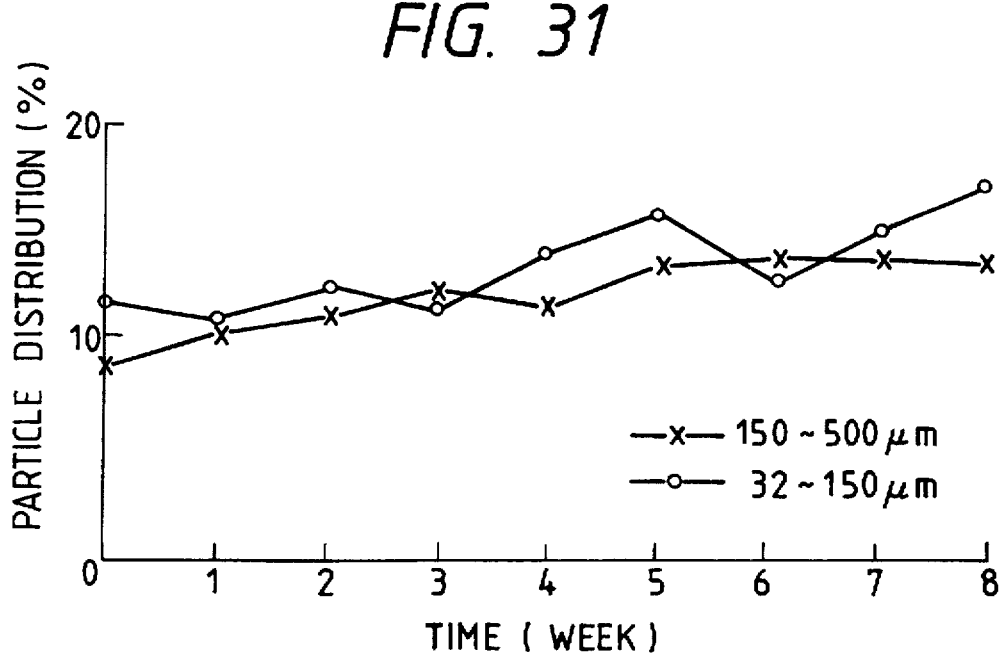
FIG. 31 is a graph showing change of soil particle diameter distribution in Example 28.
Figure 32:
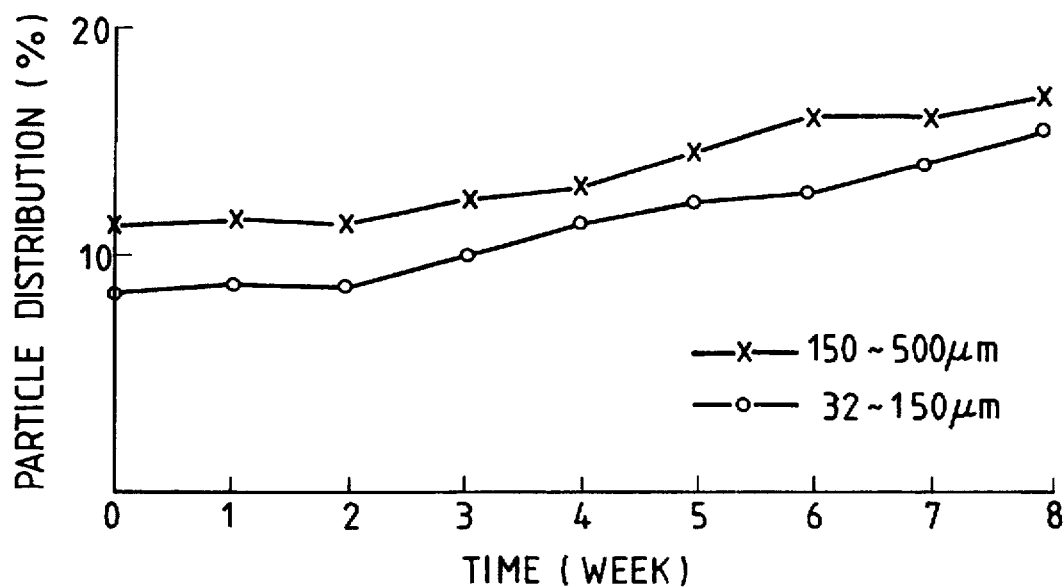
FIG. 32 is a graph showing change of soil particle diameter distribution in Example 29.

On this test soil, 5 liter of the cell suspension containing the above aggregate forming agent was sprinkled, then vibration was given to the soil for 30 minutes at a strike frequency of 600 vpm at a strike stroke of 60 mm by means of a vibration lammer (LJ-2E, made by Meiho Co., Ltd.). After the vibration, water was sprinkled as the artificial rain fall on the soil at 10 mm/day by a sprinkler. Application of the aggregate forming agent and the measurement of particle diameter distribution were carried out as in Example 13, and the results are shown in FIG. 28.

EXAMPLES 26 TO 29

*Pseudomonas putida* BH (Hashimoto and Fujita, J. Jap. Sewage Soc. Vol. 24, p. 27–33, 1987; and M. Fujita et al., Wat. Res., 27, p. 9–13, 1993) was precultured in L medium (10 g/l of peptone, 5 g/l of yeast extract, 1 g/l of glucose and 15 g/l of NaCl), inoculated into 3 liters of the culture medium, and then cultured at 30° C. for 24 hours. Next, thus obtained bacteria suspension was sprinkled together with an aggregate-forming agent on the test soil followed by the same procedures as in Examples 11, 12, 13 or 14 respectively, and the particle diameter distribution of the aggregates was then measured (Examples 26, 27, 28 and 29). The measurement of the particle diameter distribution was made in quintuplicate, and an average was taken. The results are shown in FIGS. 29 to 32.

EXAMPLES 30 AND 31

From the soil in Example 11 or 12, in which the formation of aggregates was going on, a fraction having a particle diameter of from 32 to 500 μm which increased in particle diameter distribution was collected as much as 5 g every 2 weeks, and 5 ml of M9 medium containing 0.05% of yeast extract was added to each sample. Afterward, the sample was stirred by means of a homogenizer, and the cell number of *Pseudomonas cepacia* was counted (Examples 30 and 31, respectively).

The number of the bacterial cells adsorbed on montmorillonite was counted as follows. The number of the total bacteria was determined by a relationship between absorbance and bacterial cell number, and then montmorillonite was added and allowed to settle, followed by counting the cell number in the resulting supernatant. The difference between the former count and the latter count gives the number of the cells adsorbed on montmorillonite. The above mentioned calibration curve between absorbance and cell number was prepared by plate-dilution method wherein an aliquot of a cell suspension of appropriate absorbance is spread on the agar medium containing phenol as a single carbon source.

Figure 33:
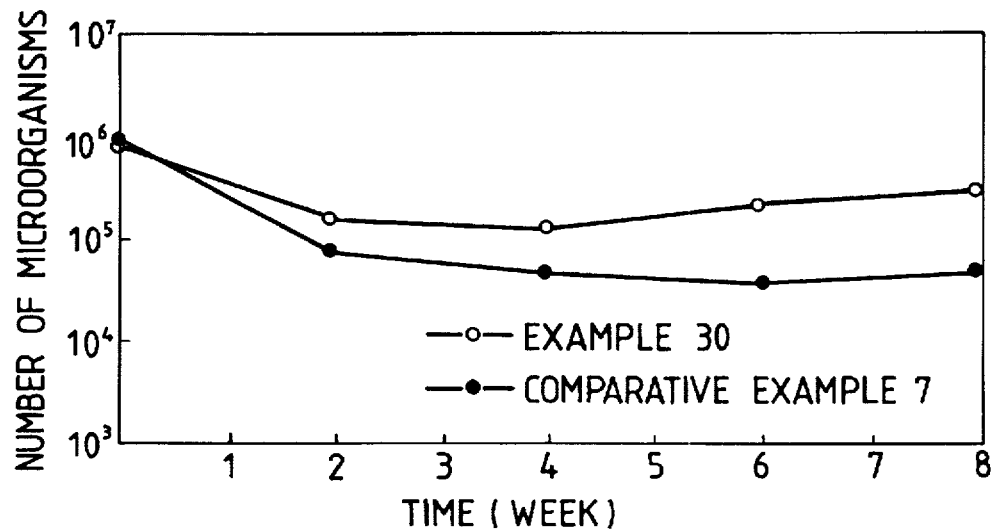
FIG. 33 is a graph comparing changes of microorganism numbers in Example 30 and Comparative Example 7.
Figure 34:
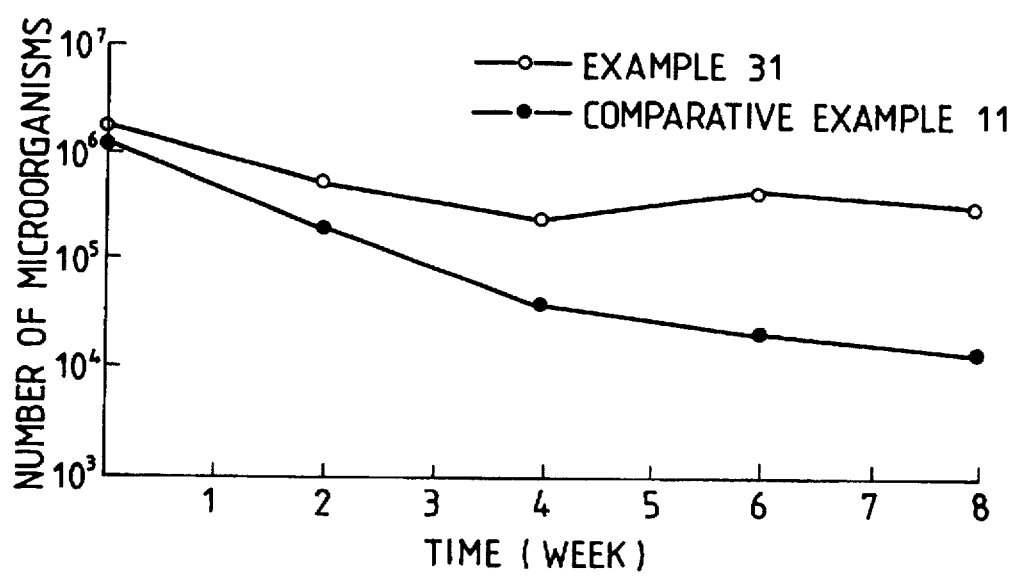
FIG. 34 is a graph comparing changes of microorganism numbers in Example 31 and Comparative Example 11.

The experiments were carried out in quintuplicate, and the bacterial cell number was denoted by an average. The results were shown in FIGS. 33 and 35.

EXAMPLES 32 AND 33

Figure 35:
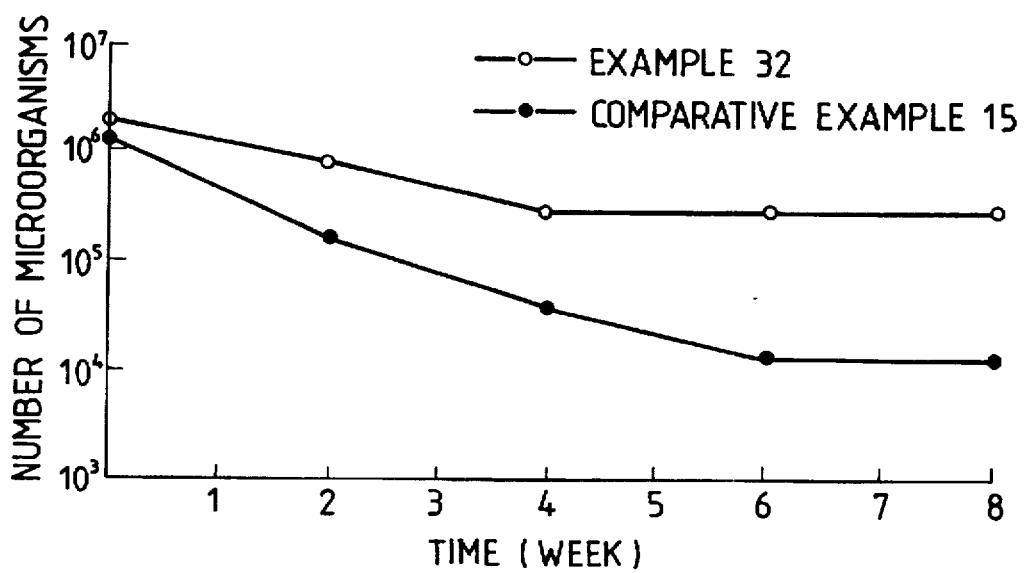
FIG. 35 is a graph comparing changes of microorganism numbers in Example 32 and Comparative Example 15.
Figure 36:
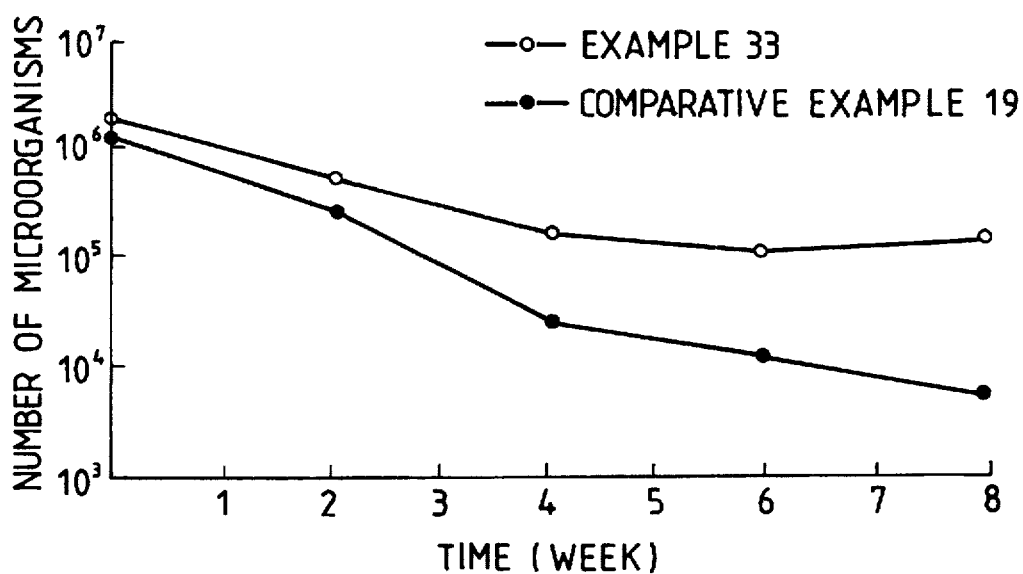
FIG. 36 is a graph comparing changes of microorganism numbers in Example 33 and Comparative Example 19.

Soil samples where the formation of aggregates was carried out in Examples 13 and 14 were collected as much as 5 g every 2 weeks, and 5 ml of M9 medium containing 0.05% of yeast extract was added thereto. Afterward, the soil samples were stirred by a homogenizer, and the cell number of *Pseudomonas cepacia* was counted by MPN method (Examples 32 and 33, respectively). The method for counting the bacteria number was the same as in Examples 30 and 31. The results are shown in FIGS. 35 and 36.

EXAMPLE 34

Figure 37:
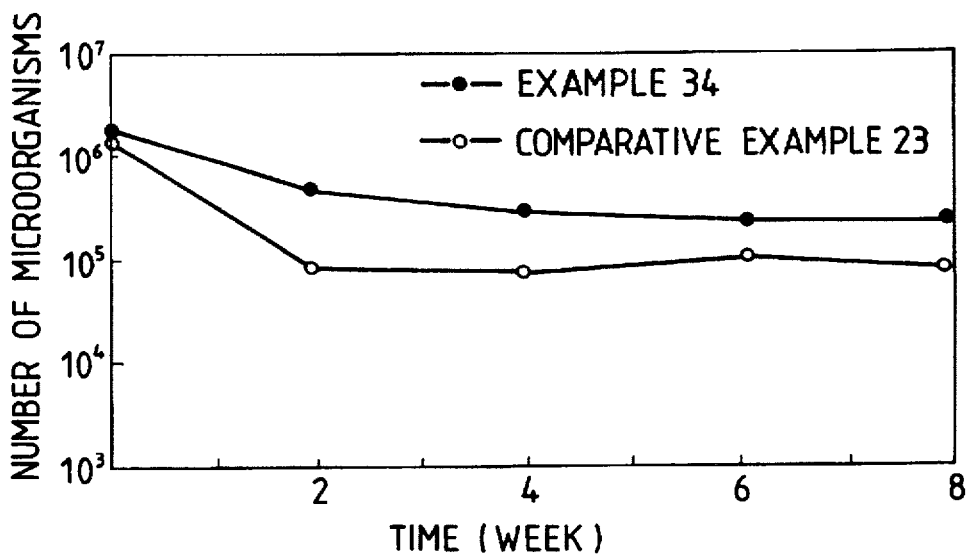
FIG. 37 is a graph comparing changes of microorganism numbers in Example 34 and Comparative Example 23.

*Pseudomonas cepacia* KK01 was precultured as in Example 11, and then transferred to 10 liters of the culture medium for the main culture. When the OD reached about 0.7, the culture was used as the bacteria suspension. Next, 10 liters of the suspension was sprinkled on the soil in which aggregate had been formed in Example 15. Except the operation period, the test soil tank was allowed to stand under a vinyl sheet cover. From the soil, a fraction having a particle diameter of from 32 to 500 μm of which increase in the particle diameter distribution was confirmed in Example 15 was collected as much as 5 g every 2 weeks, and 5 ml of an M9 medium containing 0.05% of yeast extract was added to each sample. Afterward, the sample was stirred by means of a homogenizer, and the cell number of *Pseudomonas cepacia* was counted by MPN method. The method for counting the bacteria number was the same as in Examples 30 and 31. Results are shown in FIG. 37.

EXAMPLE 35

Figure 38:
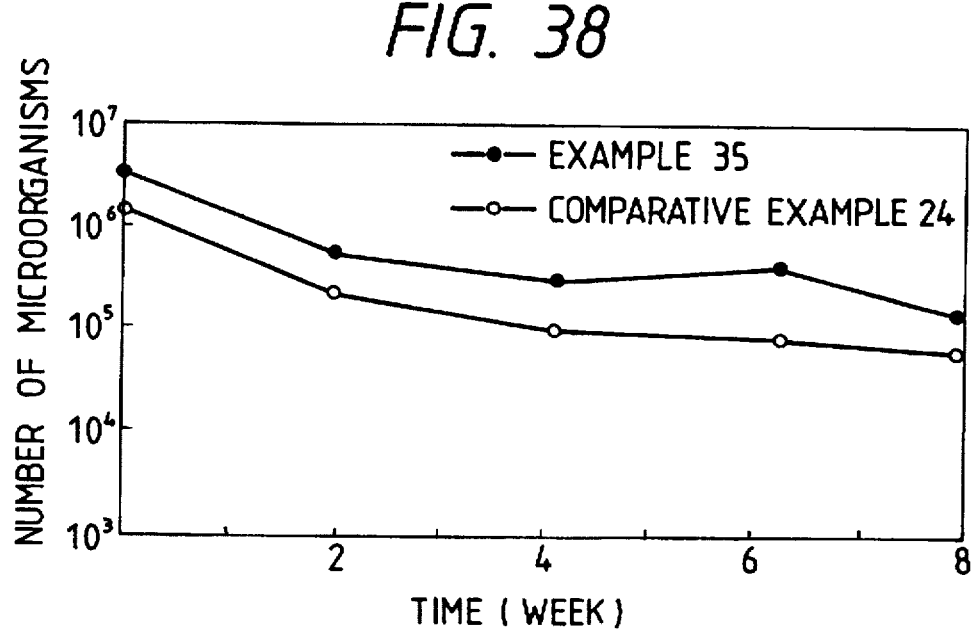
FIG. 38 is a graph comparing changes of microorganism numbers in Example 35 and Comparative Example 24.

*Bacillus substilis* ISW1214 was grown in the same manner as in Example 34 to obtain a cell suspension. Next, 10 liters of this bacteria suspension was sprinkled on the soil in which aggregate had been formed in Example 15. Afterward, 5 g of a soil fraction having a particle diameter of from 32 to 500 μm of which increase in the particle distribution was confirmed in Example 16 was collected every 2 weeks, and the number of the bacteria was then counted in the same manner as in Example 18. The results are shown in FIG. 38.

EXAMPLES 36 TO 39

Figure 39:
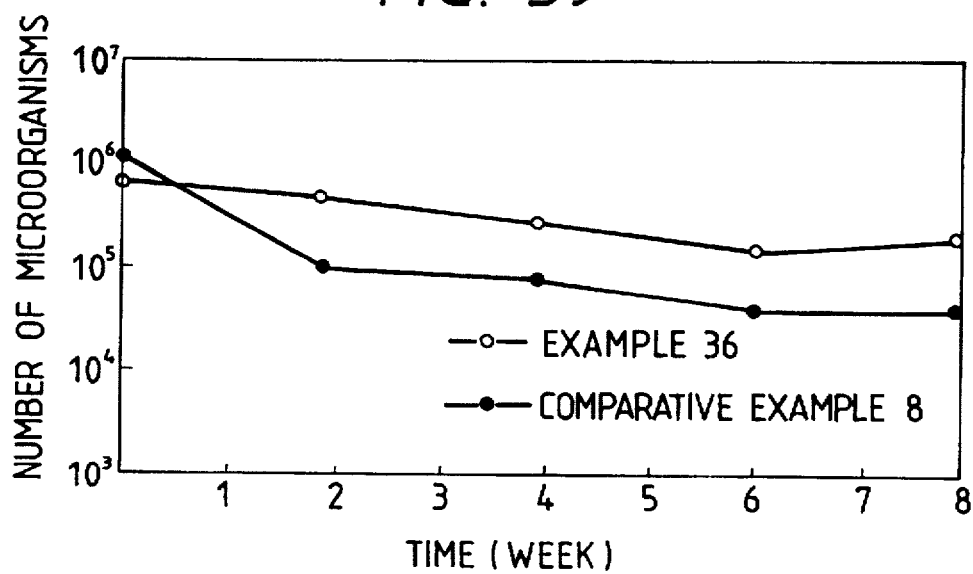
FIG. 39 is a graph comparing changes of microorganism numbers in Example 36 and Comparative Example 8.
Figure 40:
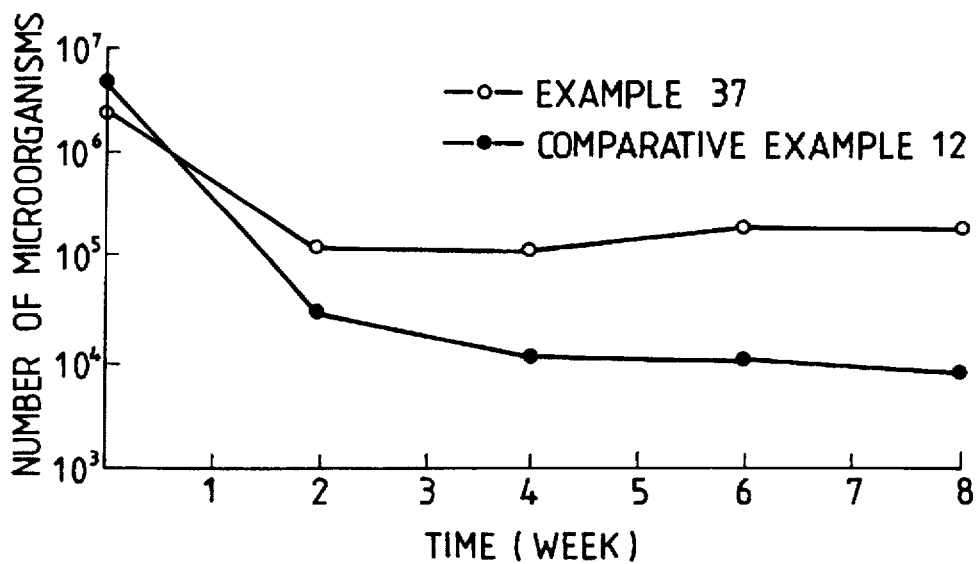
FIG. 40 is a graph comparing changes of microorganism numbers in Example 37 and Comparative Example 12.
Figure 41:
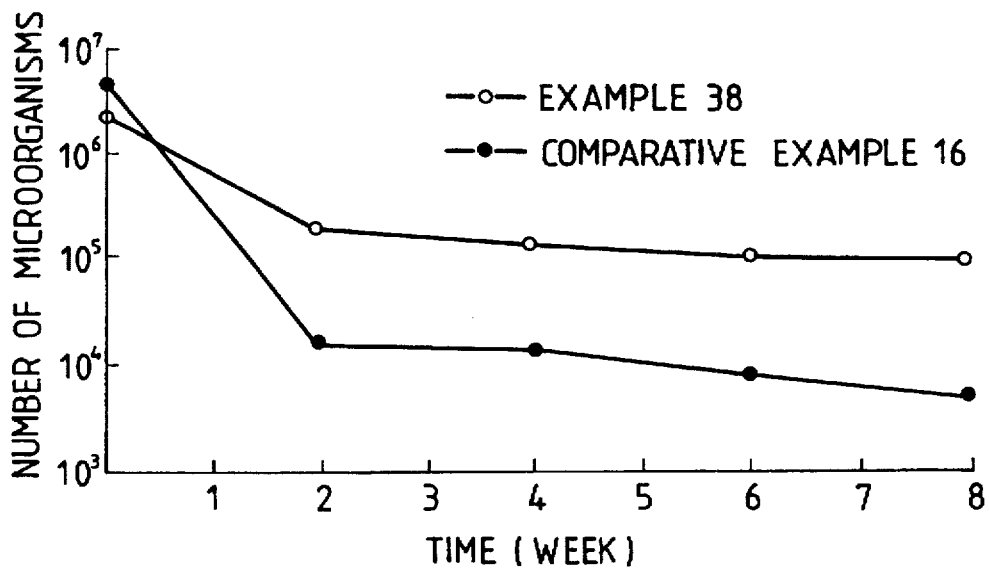
FIG. 41 is a graph comparing changes of microorganism numbers in Example 38 and Comparative Example 16.
Figure 42:
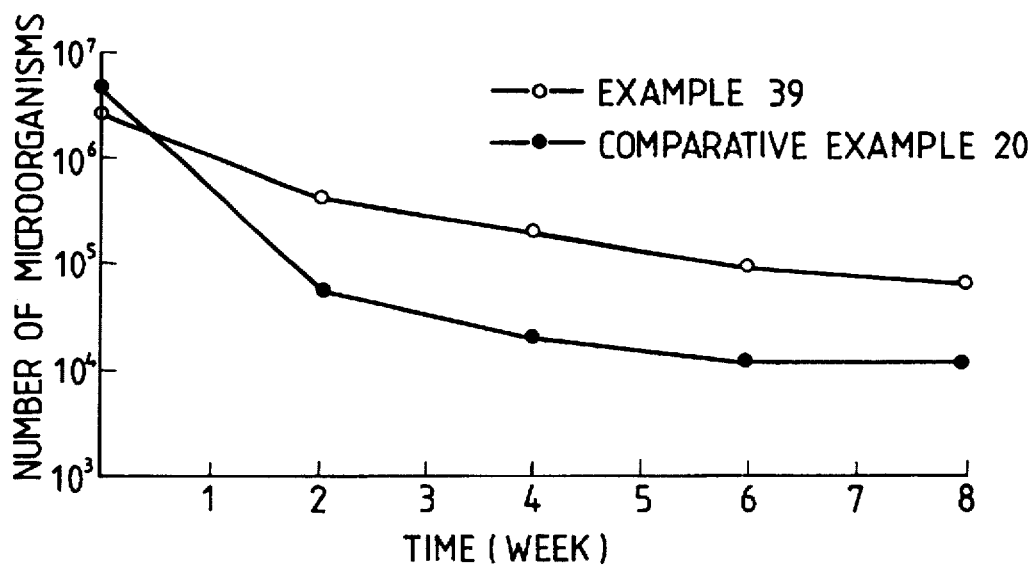
FIG. 42 is a graph comparing changes of microorganism numbers in Example 39 and Comparative Example 20.

Soil samples from Examples 19, 20, 21 and 22 were sampled as much as 5 g every 2 weeks, and the number of the bacteria was then counted (Examples 36, 37, 38 and 39, respectively, the soil sample is a fraction having a particle diameter of from 32 to 500 μm of which increase in the particle diameter distribution was confirmed). The experiments were carried out in quintuplicate, and the bacteria number was denoted by an average. The results are shown in FIGS. 39 and 42.

EXAMPLE 40

*Methylosinus trichosporium* OB3b (Cornish, A. et al., J. Gen. Microbiol, 130, pp2565–2575, 1984; Park, S. et al., Bioeng., 38, pp423–433, 1991) was inoculated into 15 ml of Higgin's NMS medium (except Cu), precultured at 30° C., and then transferred to 5 liters of the culture medium and the main culture was then carried out therein. After OD (600 nm) reached about 0.7, montmorillonite was added as the fine particles so that the montmorillonite content was 0.02%.

Figure 43:
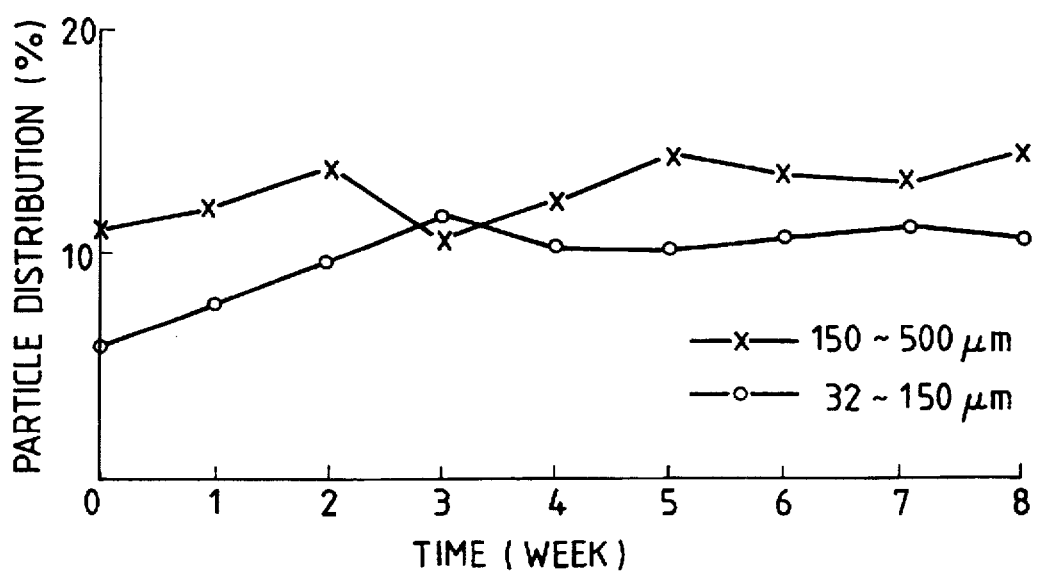
FIG. 43 is a graph showing change of soil particle diameter distribution in Example 40.

Next, 0.1% of lactose and 0.1% of viscose were added as additives to the resulting suspension to form a cell suspension containing the aggregate-forming agent. As in Example 14, three liters of the cell suspension containing aggregate forming agent were sprinkled on the test soil, followed by the same procedures and the measurement of particle diameter distribution. The test soil used herein was sand loam in which the clay mineral content was in the range of from 12.5 to 25%. The results are shown in FIG. 43.

EXAMPLE 41

Figure 44:
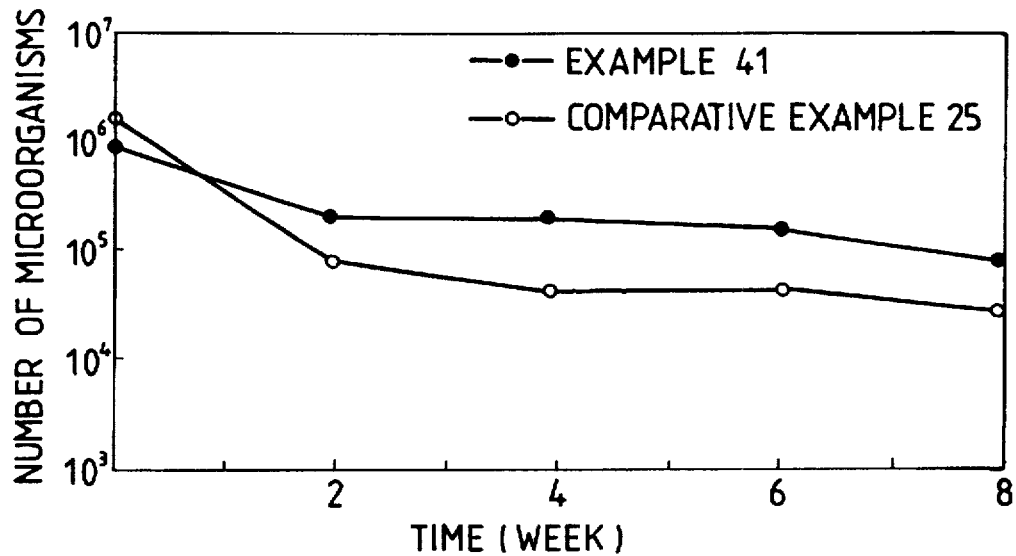
FIG. 44 is a graph comparing changes of microorganism numbers in Example 41 and Comparative Example 25.

Methylosinus was inoculated into 15 ml of M9 culture medium (containing 0.05% of yeast extract) to obtain 10 liters of a bacterial cell suspension as in Example 34. Next, 10 liters of the cell suspension was sprinkled on the soil in which aggregate had been formed in Example 17. During the experiment except the operation, the test soil was allowed to stand under a vinyl sheet cover. The soil fraction having a particle diameter of from 32 to 500 μm was collected as much as 5 g every 2 weeks, and the number of methylosinus was then counted in the same manner as in Example 34. The results are shown in FIG. 44.

EXAMPLE 42

Figure 45:
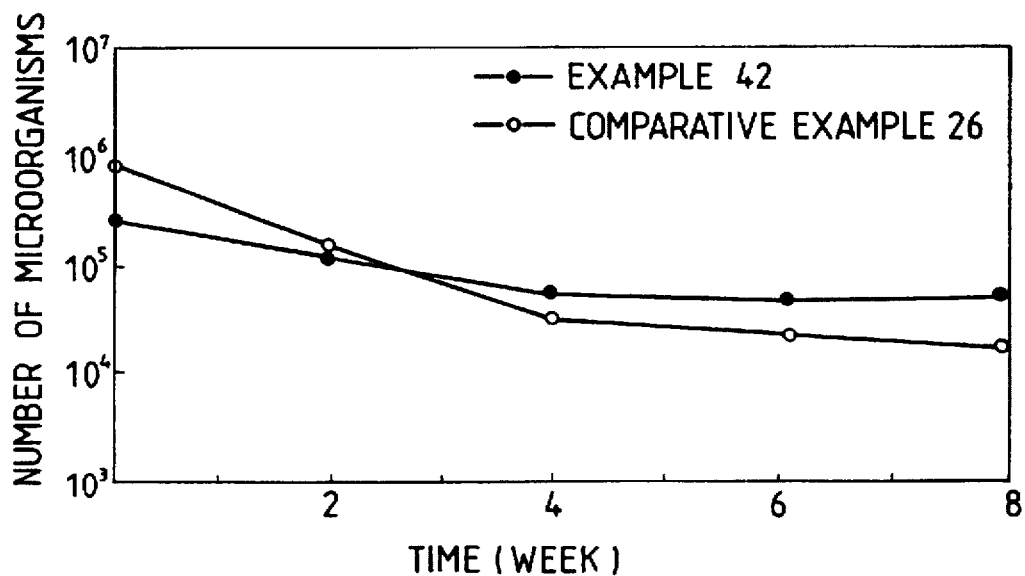
FIG. 45 is a graph comparing changes of microorganism numbers in Example 42 and Comparative Example 26.

*Pseudomonas putida* BH was precultured in L medium, inoculated into 10 liters of the culture medium, and then cultured at 30° C. for 24 hours. Next, the thus obtained bacteria suspension was sprinkled on the soil in which aggregate had been formed in Example 18. Afterward, the soil fraction having a particle diameter of from 32 to 500 μm of which increase in the particle diameter distribution was confirmed was collected as much as 5 g every 2 weeks, and the number of the bacteria was counted in the same manner as in Example 34. The results are shown in FIG. 45.

EXAMPLES 43 TO 44

Figure 46:
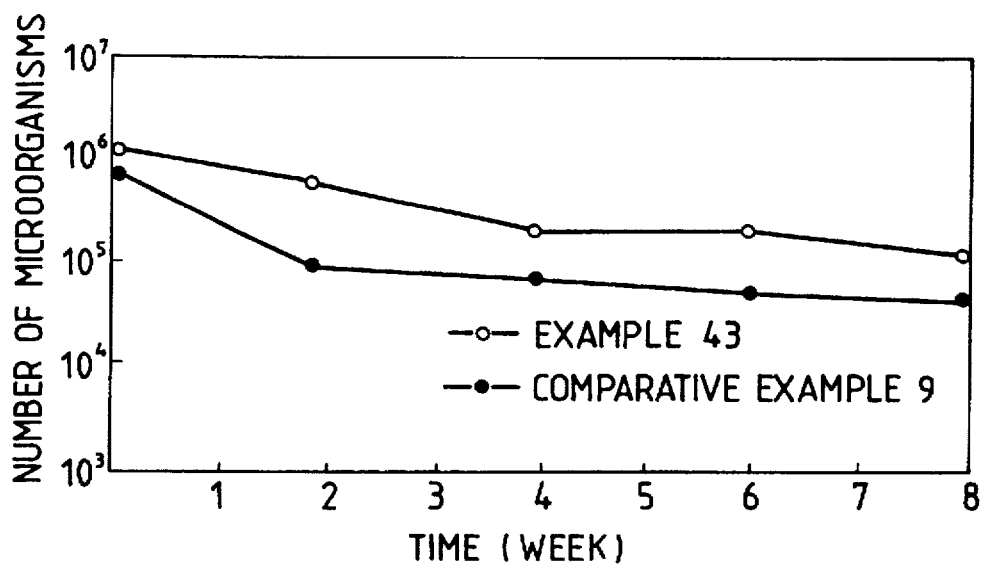
FIG. 46 is a graph comparing changes of microorganism numbers in Example 43 and Comparative Example 9.
Figure 47:
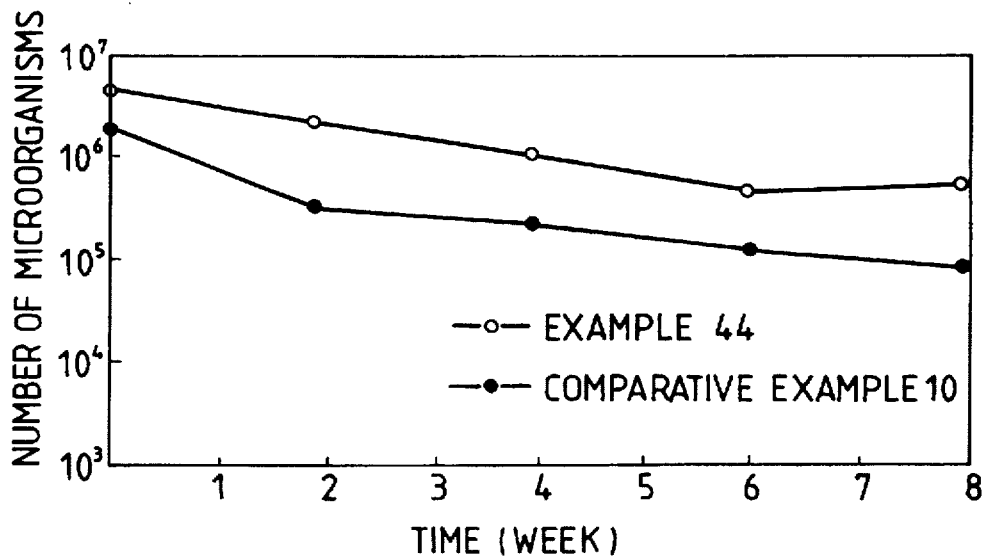
FIG. 47 is a graph comparing changes of microorganism numbers in Example 44 and Comparative Example 10.

From the soil where the formation of aggregates was going on in Examples 23 and 26, the soil fraction having a particle diameter of from 32 to 500 μm of which increase in the particle diameter distribution was confirmed was collected as much as 5 g every 2 weeks respectively, and the cell number was counted (Examples 43 and 44). The measurement was carried out in quintuplicate, and the cell number was denoted by an average. The results are shown in FIGS. 46 and 47.

EXAMPLES 45 AND 46

Figure 48:
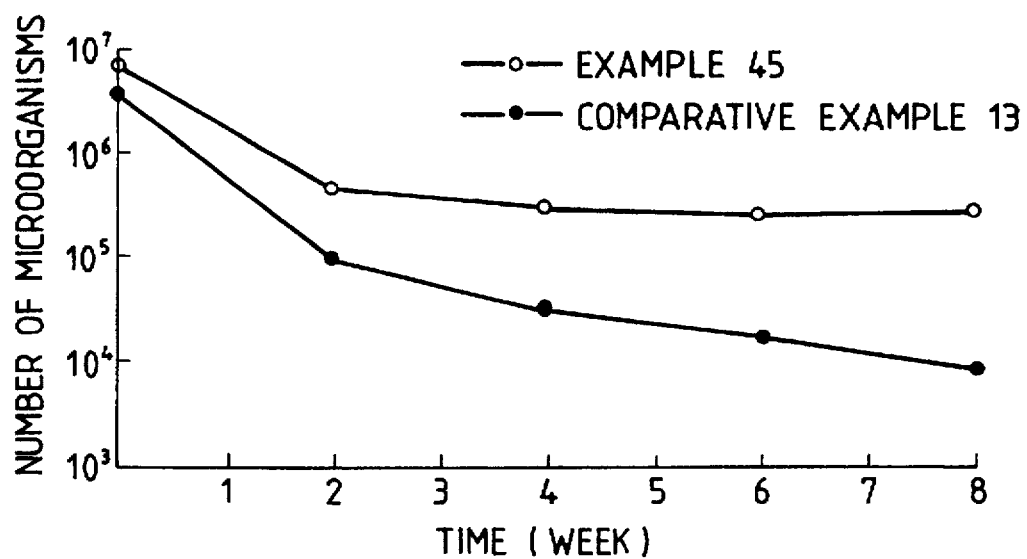
FIG. 48 is a graph comparing changes of microorganism numbers in Example 45 and Comparative Example 13.
Figure 49:
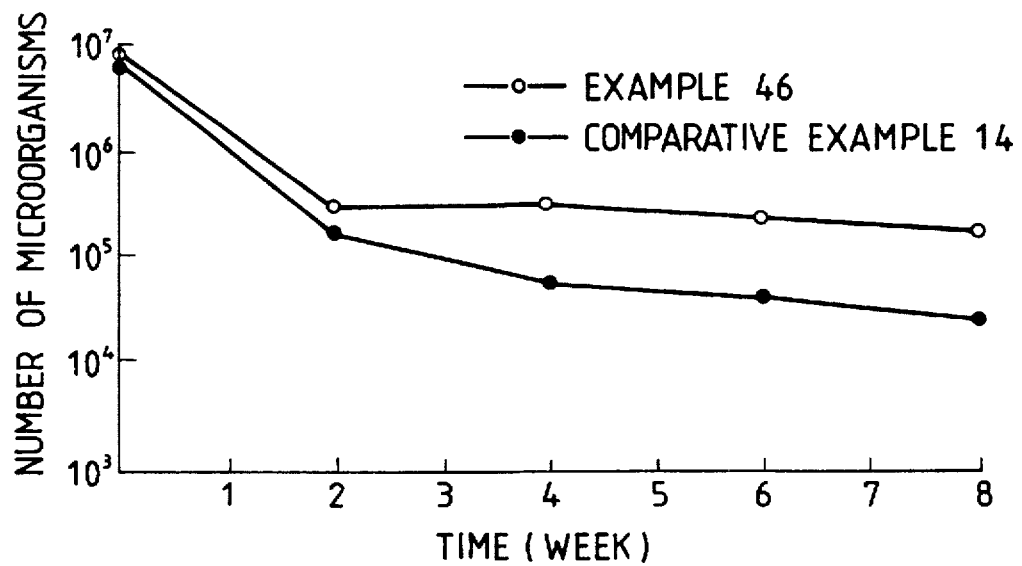
FIG. 49 is a graph comparing changes of microorganism numbers in Example 46 and Comparative Example 14.

From the soil where the formation of aggregates was going on in Examples 24 and 27, the soil fraction having a particle diameter of from 32 to 500 μm of which increase in the particle diameter distribution was confirmed was collected as much as 5 g every 2 weeks respectively, and the cell number was counted in the same manners as in Examples 27 and 31(Examples 45 and 46). The experiments were carried out in quintuplicate, and the cell number was denoted by an average. The results are shown in FIGS. 48 and 49.

EXAMPLES 47 TO 48

Figure 50:
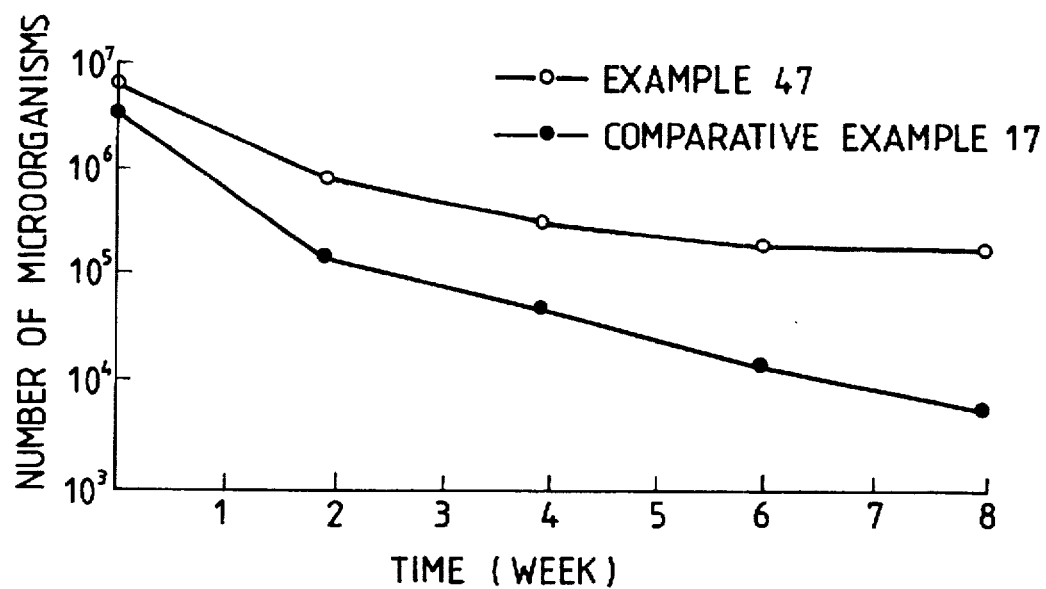
FIG. 50 is a graph comparing changes of microorganism numbers in Example 47 and Comparative Example 17.
Figure 51:
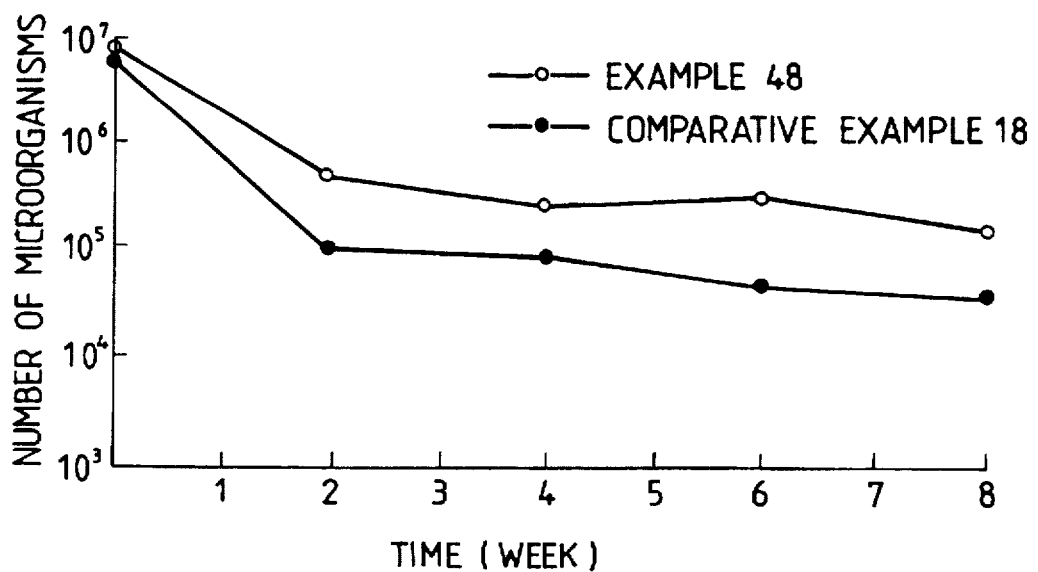
FIG. 51 is a graph comparing changes of microorganism numbers in Example 48 and Comparative Example 18.

Soil samples where the formation of aggregates was going on in Examples 25 and 28 were taken as much as 5 g every 2 weeks, and the cell number was then counted in the same manner as in Examples 28 and 32 (Examples 47 and 48, respectively). The experiments were carried out in quintuplicate, and the cell number was denoted by an average. The results are shown in FIGS. 50 and 51.

EXAMPLES 49 TO 50

Figure 52:
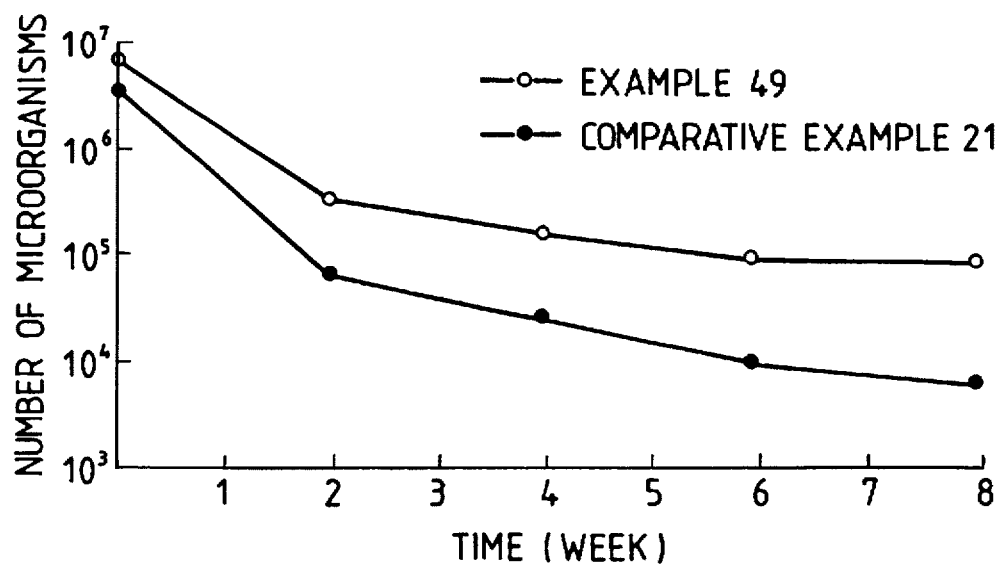
FIG. 52 is a graph comparing changes of microorganism numbers in Example 49 and Comparative Example 21.
Figure 53:
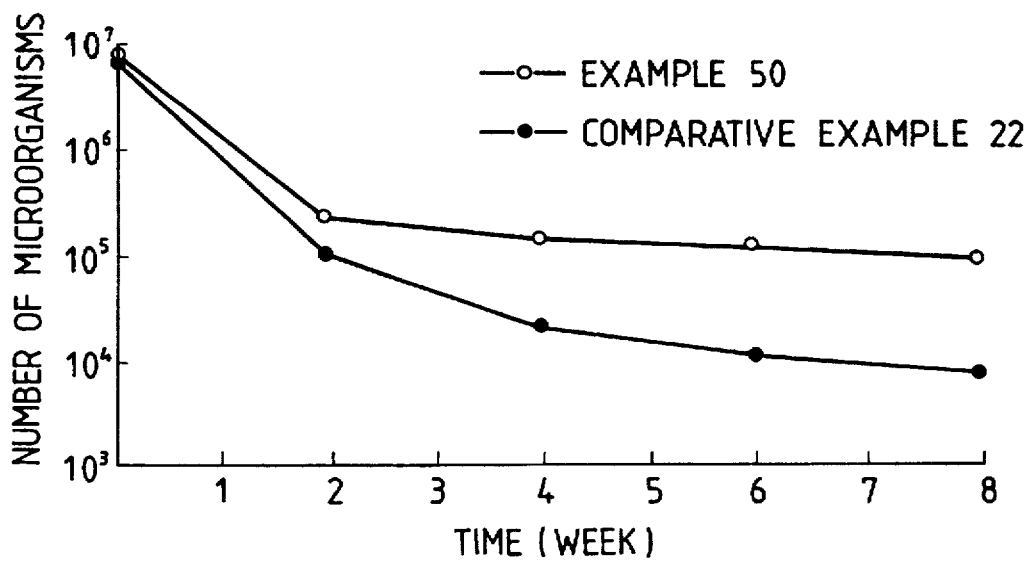
FIG. 53 is a graph comparing changes of microorganism numbers in Example 50 and Comparative Example 22.
Figure 54:
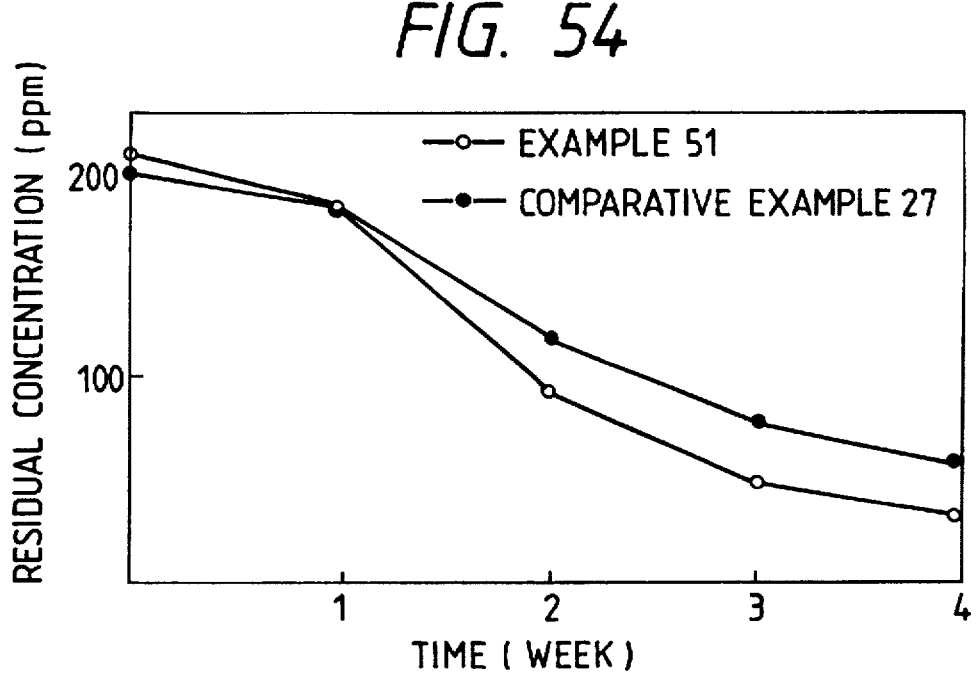
FIG. 54 is a graph comparing changes of phenol concentrations in Example 51 and Comparative Example 27.
Figure 55:
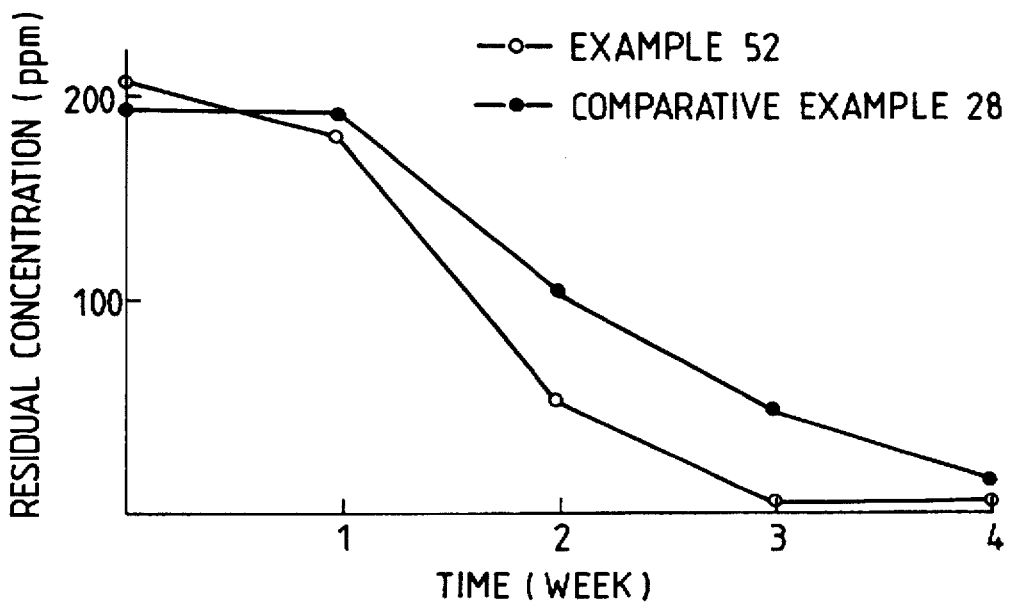
FIG. 55 is a graph comparing changes of phenol concentrations in Example 52 and Comparative Example 28.
Figure 56:
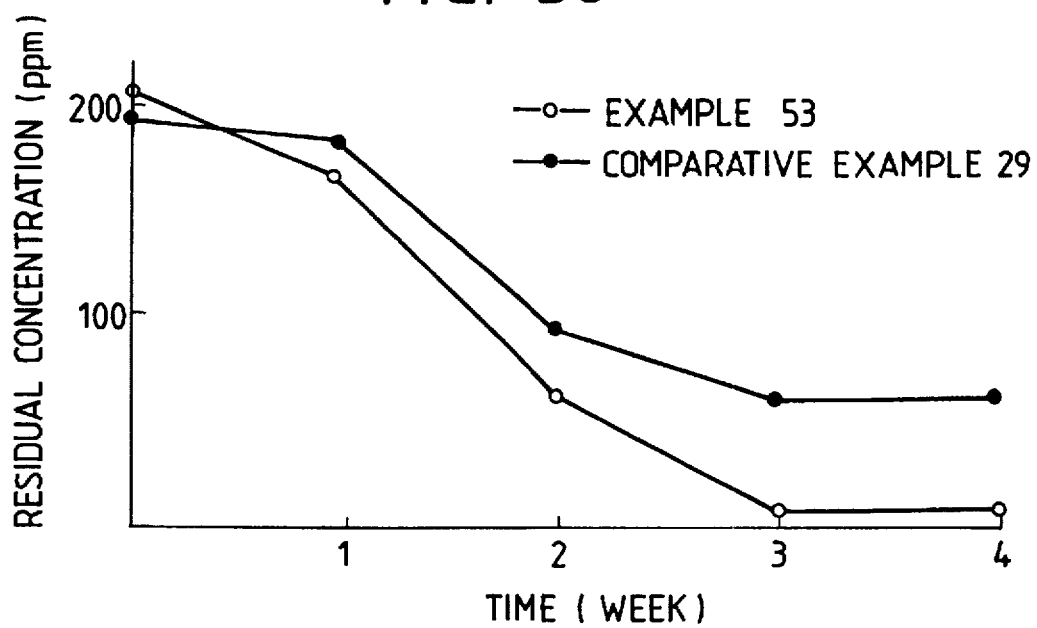
FIG. 56 is a graph comparing changes of phenol concentrations in Example 53 and Comparative Example 29.
Figure 57:
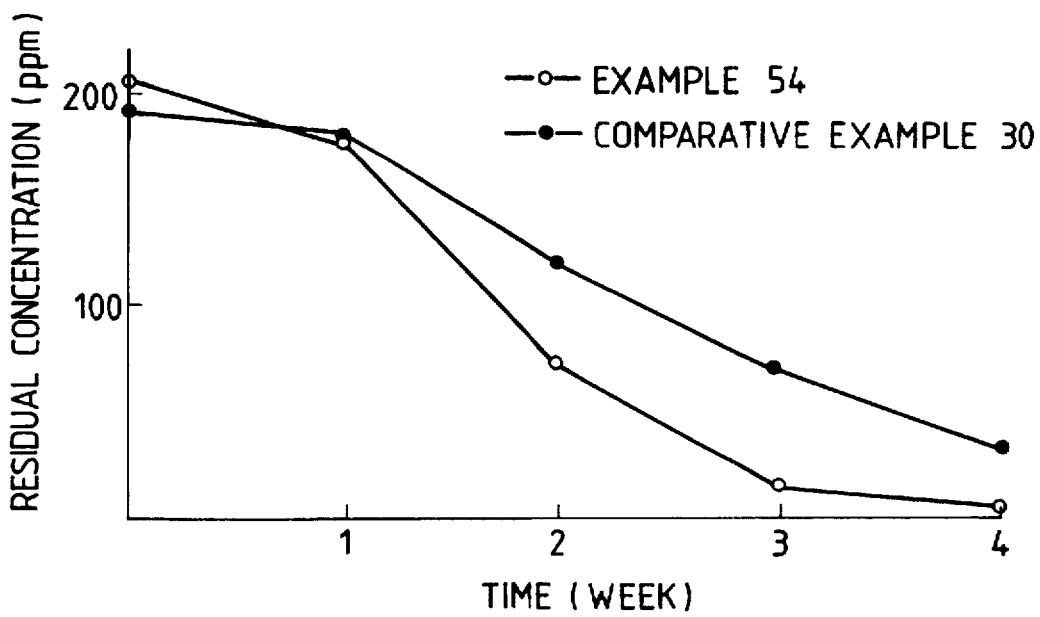
FIG. 57 is a graph comparing changes of phenol concentrations in Example 54 and Comparative Example 30.

The soils where the formation of aggregates was going on in Examples 40 and 29 were sampled as much as 5 g every 2 weeks, and the number of the bacteria was then counted in the same manners as in Examples 29 and 33 (Examples 49 and 50, respectively). The experiments were carried out in quintuplicate, and the cell number was denoted by an average. The results are shown in FIGS. 52 and 53.

COMPARATIVE EXAMPLES 7 TO 10

Cell suspensions were prepared so that the cell numbers determined by absorbance measurement might be about the same as in Examples 11, 19, 23 and 26 respectively. Three liters of each suspension were sprinkled on the clay loam in each test soil tank prepared as in Examples 11, 19, 23 and 26 (Comparative Examples 7, 8, 9 and 10). Next, water sprinkle using a sprinkling can and heating were carried out under conditions shown in the following table, and during the experiment except this operation, the test soil tanks were allowed to stand outdoor under airy and rain-protected conditions. Afterward, sampling and the measurement of cell numbers were done in the same manner as in Example 30. The experiments were carried out in quintuplicate, and the bacteria number was denoted by an average. The results are shown in FIGS. 33, 39, 46 and 47.

TABLE 1

|  | Water Spary Conditions | Heating Conditions |
|---|---|---|
| Comp. Example 7 | 5 liters/2 days | Warm water at 35° C., About 5 liters/hour |
| Comp. Example 8 | 10 liters/3 days | Warm water at 40° C., 1 liter/minute |
| Comp. Example 9 | 5 liters/3 days | 30° C. by panel heater |
| Comp. Example 10 | 5 liters/3 days | 30° C. by panel heater |

COMPARATIVE EXAMPLES 11 TO 14

Bacteria suspensions were prepared so that the bacteria numbers determined by absorbance measurement might be about the same in Examples 12, 20, 24 and 27 respectively. Three liters of each suspension were sprinkled on the clay loam in each test soil tank prepared as in Examples 12, 20, 24 and 27 (Comparative Examples 11, 12, 13 and 14). Next, water sprinkle using a sprinkling can were carried out at 5 mm/day, disturbance of the soil was carried out once/7 days. During the experiment except these operations, the test soil tanks were allowed to stand outdoor under a vinyl sheet cover. Afterward, sampling and the measurement of bacteria numbers were done in the same manner as in Example 31. The experiments were carried out in quintuplicate, and the bacteria number was denoted by an average. The results are shown in FIGS. 34, 40, 48 and 49.

COMPARATIVE EXAMPLES 15 TO 18

Cell suspensions were prepared so that the cell numbers determined by absorbance measurement might be about the same as in Examples 13, 21, 25 and 28 respectively. Three liters of each suspension were sprinkled on the clay loam in each test soil tank prepared as in Examples 13, 21, 25 and 28 (Comparative Examples 15, 16, 17 and 18). Next, water sprinkle using a sprinkling can was carried out at 5 mm/day, disturbance of the soil was carried out once/7 days. During the experiment except these operations, the test soil tanks were allowed to stand under a vinyl sheet cover. Sampling and the measurement of cell numbers were done in the same manner as in Example 32. The experiments were carried out in quintuplicate, and the cell number was denoted by an average. The results are shown in FIGS. 35, 41, 50 and 51.

COMPARATIVE EXAMPLES 19 TO 22

Bacteria suspensions were prepared so that the bacteria numbers determined by absorbance measurement might be about the same as in Examples 14, 22, 40 and 29 respectively. Three liters of each suspension was sprinkled on the clay loam in each test soil tank prepared as in Examples 14, 22, 40 and 29 (Comparative Examples 19, 20, 21 and 22). Next, water sprinkle using a sprinkling can were carried out at 5 mm/day, disturbance of the soil was carried out once/7 days. During the experiment except these operations, the test soil tanks were allowed to stand under a vinyl sheet cover. Afterward, sampling and the measurement of bacteria numbers were done in the same manner as in Example 33. The experiments were carried out in quintuplicate, and the bacteria number was denoted by an average. The results are shown in FIGS. 36, 42, 52 and 53.

COMPARATIVE EXAMPLES 23 TO 26

Bacteria suspensions were prepared so that the bacteria numbers determined by absorbance measurement might be about the same as in Examples 34, 35, 41 and 42 respectively. Ten liters of each suspension were sprinkled on the clay loam in each test soil tank containing the same kind of the soil as used in Examples 15, 16, 17 and 18 except that the aggregate formation had not been carried out (Comparative Examples 23, 24, 25 and 26). During the experiment except the operation, the test soil tanks were allowed to stand under a vinyl sheet cover. Afterward, sampling and the measurement of bacteria numbers were done in the same manner as in Example 34. The experiments were carried out in quintuplicate, and the bacteria number was denoted by an average. The results are shown in FIGS. 37, 38, 44 and 45.

EXAMPLES 51 TO 55

The same kind of test soils as used in Examples 11, 12, 13, 14 and 15 were prepared (Examples 51, 52, 53, 54 and 55, respectively), and on these soils, phenol was sprinkled so as to be 0.2 g/g of the dry soil, 200 ppm, 0.2 g/g of the dry soil, 0.2 g/g of the dry soil and 200 ppm. Afterward, the soils polluted with phenol were laid in test soil tanks. Next, an aggregate-forming agent and a bacterial suspension were sprinkled on each test soil (Examples 51–54) or the soil was treated as in Example 15 (Example 55). Then the treatment in the same manner as in Examples 11, 12, 13, 14 and 34 were carried out.

Each soil was sampled as much as 10 g every one week, and phenol was determined by aminoantipyrine absorptiometric method (a method prescribed in JIS Standards 28-1). The experiments were carried out in quintuplicate, and the concentration of phenol was denoted by an average. The results are shown in FIGS. 54 to 58.

COMPARATIVE EXAMPLES 27 TO 30

Bacteria suspensions were prepared so that the bacteria numbers determined by absorbance measurement might be about the same as in Examples 51, 52, 53 and 54 respectively. Three liters of each suspension were sprinkled on the clay loam in each test soil tank prepared as in Examples 11, 12, 13 and 14 (Comparative Examples 27, 28, 29 and 30). Next, water sprinkle using a sprinkling can were carried out at 5 liter/2 days. As for comparative Example 27, water was sprinkled at 5 liter 2 days and warm water of 35 C. was circulated at 5 liter/hour, and the test tank was left stand outdoor under airy, rain-protected conditions except the operation period. As for Comparative Examples 28–30, the artificial rain fall at 5 mm/day, and the soil disturbance of once/7 days were carried out. During the experiments except the operations, they were left stand under a vinyl sheet cover. The measurement of bacteria numbers were done in the same manner as in Example 34. Afterward, for these soils, sampling and the measurement of phenol concentrations were done in the same manner as in Examples 51, 52, 53 and 54. The experiments were carried out in quintuplicate, and the concentration was denoted by an average. The results are shown in FIGS. 54, 55, 56 and 57.

COMPARATIVE EXAMPLE 31

Figure 58:
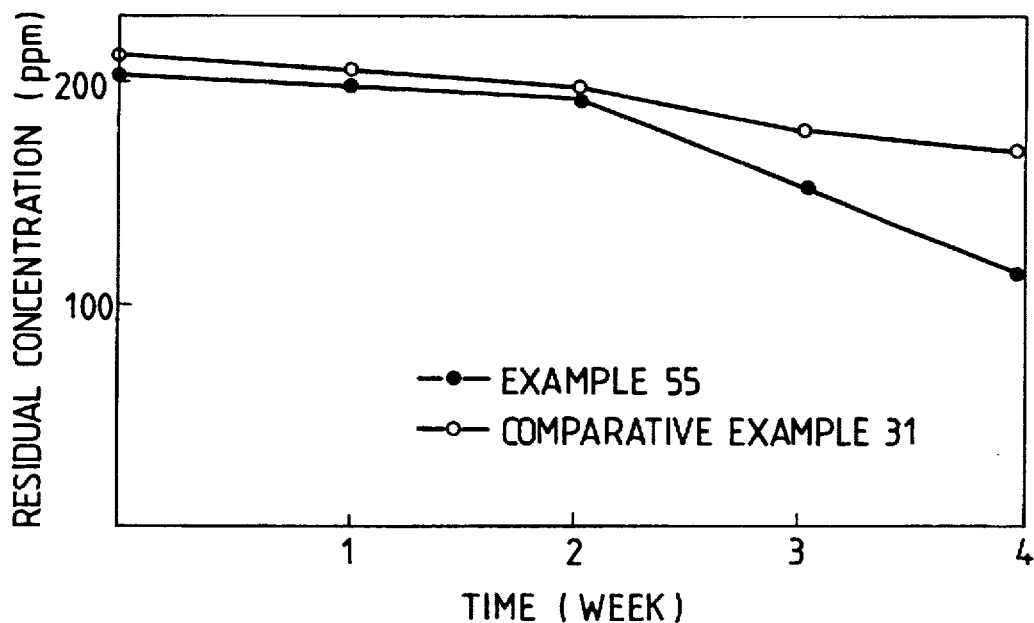
FIG. 58 is a graph comparing changes of phenol concentrations in Example 55 and Comparative Example 31.
Figure 59:
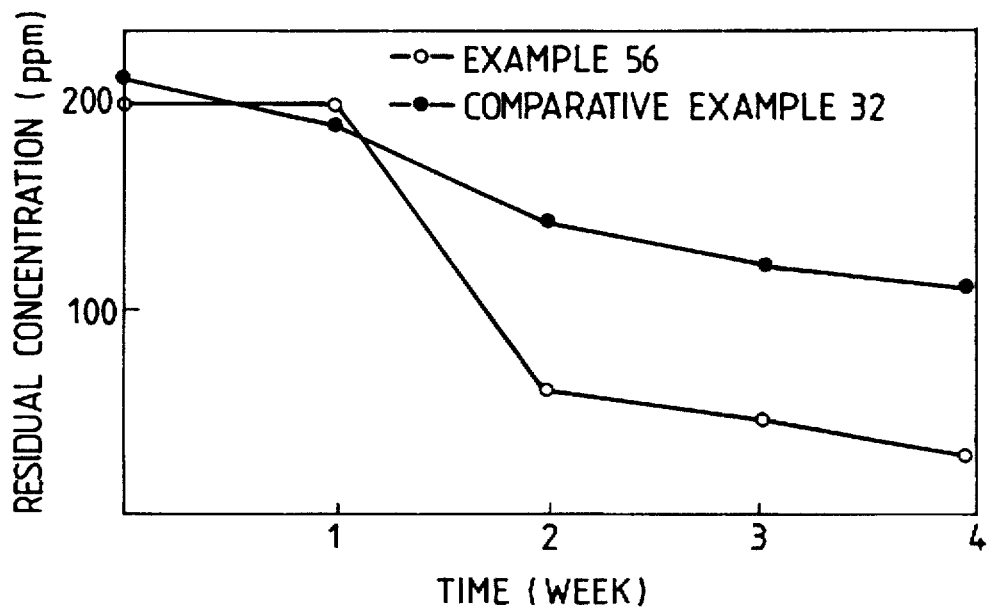
FIG. 59 is a graph comparing changes of phenol concentrations in Example 56 and Comparative Example 32.
Figure 60:
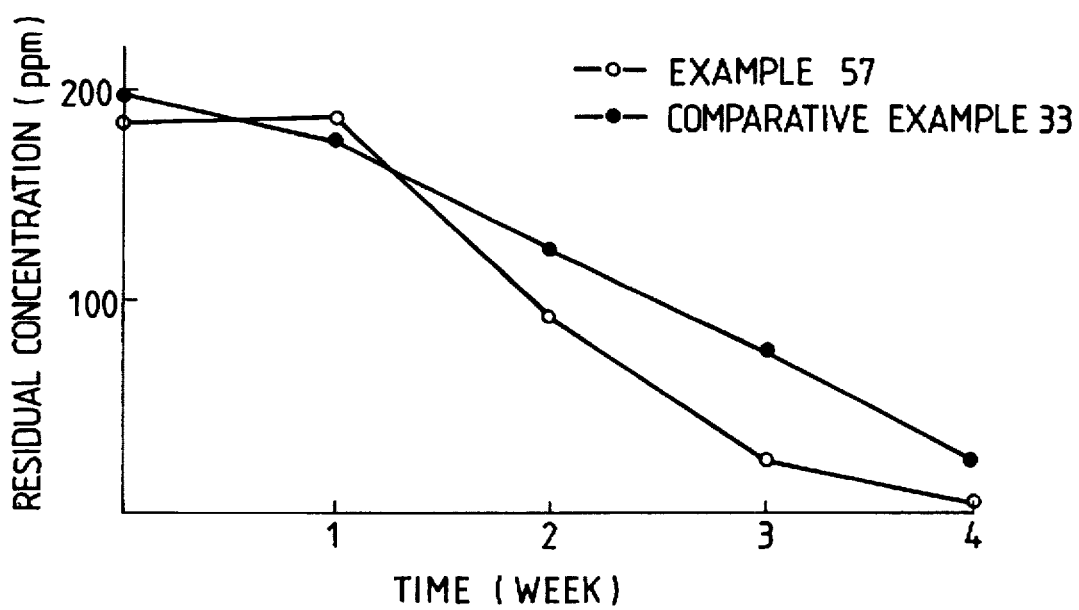
FIG. 60 is a graph comparing changes of phenol concentrations in Example 57 and Comparative Example 33.
Figure 61:
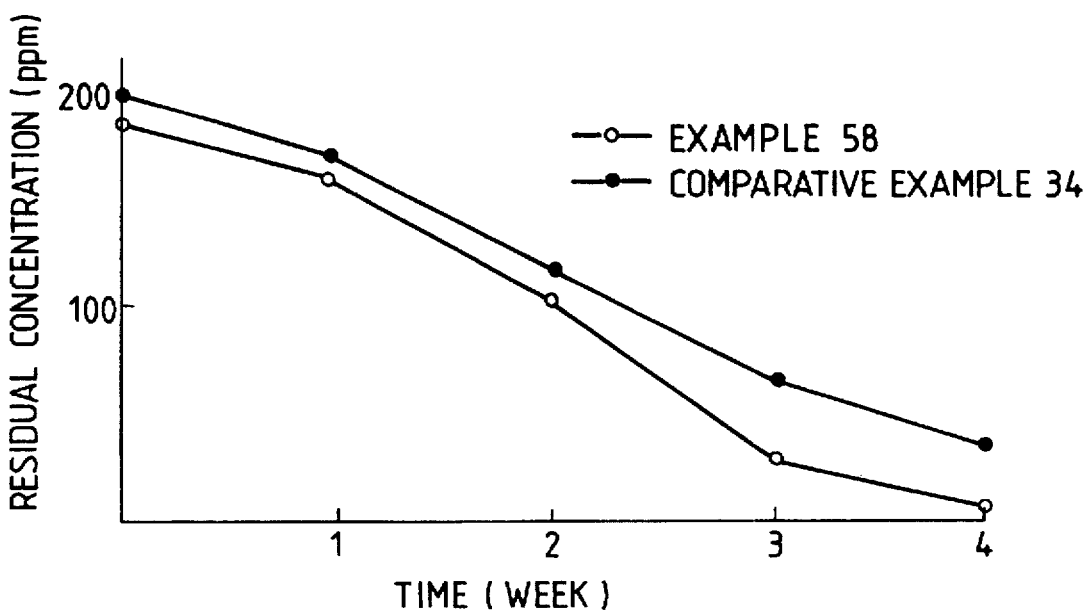
FIG. 61 is a graph comparing changes of phenol concentrations in Example 58 and Comparative Example 34.
Figure 62:
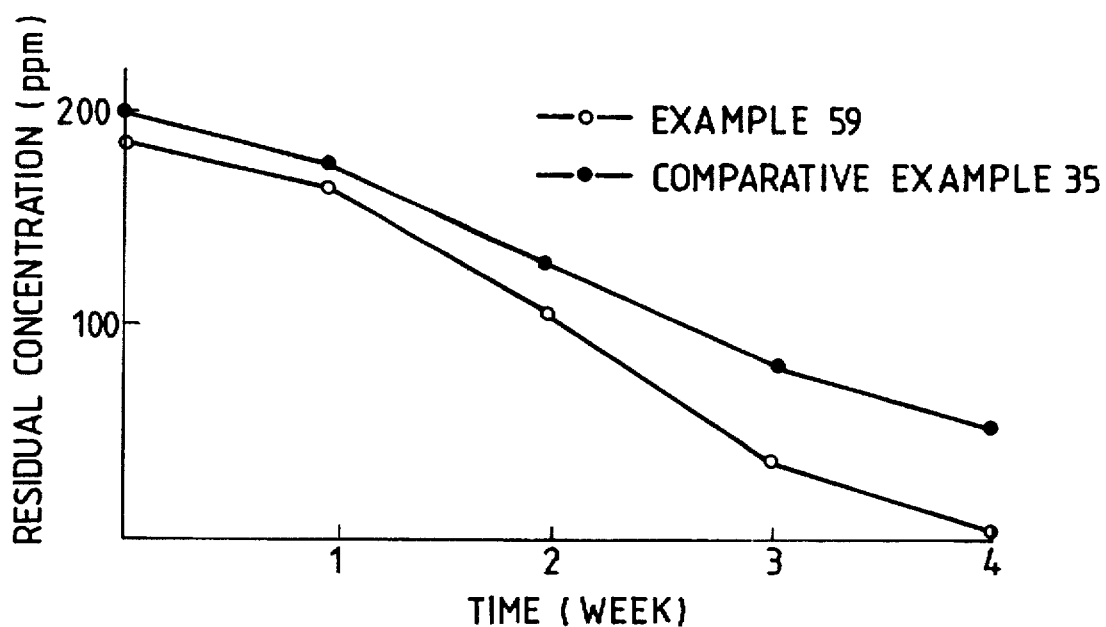
FIG. 62 is a graph comparing changes of phenol concentrations in Example 59 and Comparative Example 35.
Figure 63:
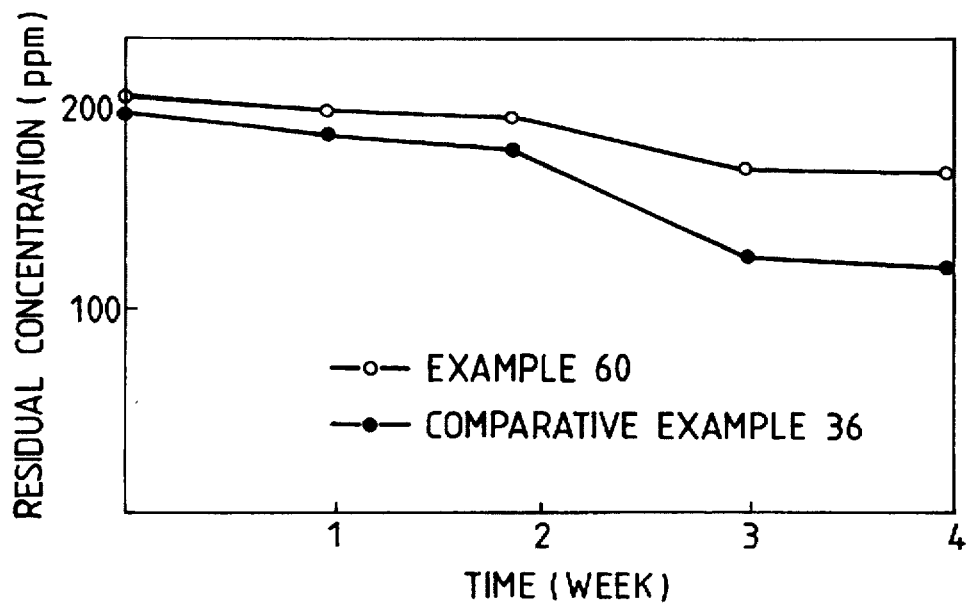
FIG. 63 is a graph comparing changes of phenol concentrations in Example 60 and Comparative Example 36.

Bacteria suspensions were prepared so that the bacteria numbers determined by absorbance measurement might be about the same as in Examples 55. Ten liters of the suspension were sprinkled on the clay loam in a test soil tank prepared as in Examples 15. Next, water sprinkle using a sprinkling can was carried out at 10 mm/day. During the experiment except these operations, the test soil tanks were allowed to stand under a vinyl sheet cover. Afterward, sampling and the measurement of the phenol concentration were done in the same manner as in Example 55. The experiments were carried out in quintuplicate, and the result was denoted by an average. The results are shown in FIG. 58.

EXAMPLES 56 TO 60

The same test soils as in Examples 26, 27, 28, 29 and 18 were prepared (Examples 56 to 60), and on these soils, phenol was sprinkled so as to be 0.2 g/g of the dry soil, 200 ppm, 0.2 g/g of the dry soil, 0.2 g/g of the dry soil and 200 ppm. Afterward, the soils polluted with phenol were deposited in test soil tanks. Next, in Examples 56, 57, 58 and 59, the bacteria suspension and the aggregate-forming agent were sprinkled on, and soil treatment was done in the same manner as in Examples 26, 27, 28 and 29 respectively. In Example 56, five liters of water were sprinkled on the soil at an interval of 3 days, and the soil was warmed up to 30° C. by panel heaters. In Example 60, the bacteria suspension and the aggregate-forming agent were sprinkled on the soil in the same manner as in Example 42, and the artificial rain was applied at 10 mm/day. During the experiments except the operations, the test soil tanks were allowed to stand under a vinyl sheet cover.

Each of these soils of Examples 56 to 60 was sampled as much as 5 g, 5 g, 10 g, 5 g and 10 g every one week, and phenol concentration was determined by aminoantipyrine absorptiometric method. The experiments were carried out in quintuplicate, and the concentration of phenol was denoted by an average. The results are shown in FIGS. 59 to 63.

COMPARATIVE EXAMPLES 32 TO 36

Bacteria suspensions were prepared so that the bacteria numbers determined by absorbance measurement might be about the same as in Examples 56, 57, 58, 59 and 60. Three liters of each suspension were sprinkled on the clay loam in the test soil tanks prepared as in Examples 11, 12, 13, 14 and 18 (Comparative Examples 32, 33, 34, 35 and 36, respectively). Next, in Comparative Example 32, water was sprinkled on the soil at 5 liters/3 days, and the soil was always warmed up to 30° C. by panel heaters, and in a period except this operation, the test soil tank was allowed to stand outdoor under airy, rain-protected conditions. In Comparative Examples 33 to 35, the artificial rain at 5 mm/day and the stirring of the test soil at an interval of 7 days were given, and except the period of these operations, the test soil tanks were allowed to stand under a vinyl sheet cover. In Comparative Example 36, the artificial rain was given at 10 mm/day.

Afterward, for these soils of Comparative Examples 32, 33, 34, 35 and 36, sampling and the measurement of phenol concentrations were done in the same manner as in Examples 56, 57, 58, 59 and 60. The results are shown in FIGS. 59, 60, 61, 62 and 63.

According to the method of the present invention, the aggregate formation of soil can be accelerated, and the survival rate of pollutant-degrading microorganisms can be improved, so that the polluted soil can be successfully and stably remedied.

What is claimed is:

1. A method for remedying a soil environment contaminated with a pollutant comprising the steps of:
   providing an aqueous liquid containing a natural adhesive agent and an aerobic microorganism capable of degrading the pollutant;
   adding the aqueous liquid into the soil environment and forming aggregates of soil particles in the soil environment, said aggregates providing a habitat for said microorganism; and
   degrading the pollutant with the microorganism dwelling in the aggregates contained in the soil to remedy the soil environment.

2. A method according to claim 1, wherein the natural adhesive agent is an agent selected from the group consisting of a protein-based adhesive, a starch-based adhesive, a cellulose-based adhesive and a polysaccharide complex-based adhesive.

3. A method according to claim 2, wherein the protein-based adhesive is at least one of glue, gelatin, albumin, casein and soybean protein.

4. A method according to claim 2, wherein the starch-based adhesive is a condensation polymer of D-glucose.

5. A method according to claim 2, wherein the cellulose-based adhesive is at least one of methyl cellulose, ethyl cellulose, cellulose acetate and viscose.

6. A method according to claim 2, wherein the polysaccharide complex-based adhesive is at least one of a gum, manna, alginic acid, carrageenan and agar.

7. A method according to claim 1, further comprising the step of sprinkling water onto the soil containing the natural adhesive and the microorganism.

8. The method according to claim 1, further comprising the step of physically disturbing the soil to which the aqueous liquid has been added.

9. The method according to claim 8, wherein the physically disturbing step is conducted prior to said adding step of the microorganisms to the soil.

10. The method according to claim 8, wherein said physically disturbing step comprises heating the soil environment.

11. The method according to claim 8, wherein said physically disturbing step comprises stirring the soil environment.

12. The method according to claim 8, wherein said physically disturbing step comprises vibrating the soil environment.

13. The method according to claim 12, wherein said vibrating step is conducted with ultrasonic waves.

14. The method according to claim 8, wherein said physically disturbing step comprises freezing water in the soil environment to form ice crystals and then drying the soil environment without melting the ice crystals.

15. A method for remedying a pollutant-contaminated soil which comprises the steps of:
   providing a soil containing soil particles contaminated with a pollutant comprising a chemical substance;
   adding to the soil an aerobic microorganism capable of degrading the chemical substance;
   adding to the soil an aggregate-forming agent containing a natural adhesive agent selected from the group consisting of a protein-based adhesive a starch-based adhesive, a cellulose-based adhesive and a polysaccharide complex-based adhesive to form aggregates of the soil particles, said aggregates providing a habitat for said microorganism; and
   remedying the polluted soil with the microorganism dwelling in the aggregates contained in the soil.

16. A method according to claim 15, wherein the protein-based adhesive is at least one of glue, gelatin, albumin, casein and soybean protein.

17. A method according to claim 15, wherein the starch-based adhesive is a condensation polymer of D-glucose.

18. A method according to claim 15, wherein the cellulose-based adhesive is at least one of methyl cellulose, ethyl cellulose, cellulose acetate and viscose.

19. A method according to claim 15, wherein the polysaccharide complex-based adhesive is at least one of a gum, manna, alginic acid, carrageenan and agar.

20. A method according to claim 15, wherein the aggregate-forming agent includes particles to accelerate the aggregation of said soil particles.

21. A method according to claim 20, wherein said particles comprise an inorganic material.

* * * * *

UNITED STATES PATENT AND TRADEMARK OFFICE
CERTIFICATE OF CORRECTION

PATENT NO. : 5,753,003

DATED : May 19, 1998

INVENTOR(S) : ETSUKO SUGAWA, ET AL.

It is certified that error appears in the above-identified patent and that said Letters Patent is hereby corrected as shown below:

On the title page:
AT [30] FOREIGN APPLICATION PRIORITY DATA

"Oct. 16, 1993 [JP] Japan ... 5-026933" should read
--Feb. 16, 1993 [JP] Japan ... 5-026933--.

Signed and Sealed this

Twenty-third Day of February, 1999

Attest:

Q. TODD DICKINSON

Attesting Officer

Acting Commissioner of Patents and Trademarks